US007529214B2

United States Patent
Omae et al.

(10) Patent No.: US 7,529,214 B2
(45) Date of Patent: May 5, 2009

(54) MOBILE NODE FOR TRANSMITTING A REQUEST FOR INFORMATION WHICH SPECIFIES A TRANSFER DEVICE TO BE USED

(75) Inventors: Koji Omae, Yokohama (JP); Masahiro Inoue, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 676 days.

(21) Appl. No.: 10/785,061

(22) Filed: Feb. 25, 2004

(65) Prior Publication Data

US 2004/0165565 A1    Aug. 26, 2004

(30) Foreign Application Priority Data

Feb. 26, 2003    (JP)    ............................. 2003-050017

(51) Int. Cl.
    *H04W 4/00*    (2009.01)
(52) U.S. Cl. ...................................... 370/338; 370/331
(58) Field of Classification Search ......... 455/436–445; 370/389–399, 331–334, 338, 351–356; 709/230–244
    See application file for complete search history.

(56) References Cited

U.S. PATENT DOCUMENTS

| 2002/0191560 | A1* | 12/2002 | Chen et al. | 370/331 |
| 2004/0090958 | A1* | 5/2004 | Park et al. | 370/389 |
| 2004/0095912 | A1* | 5/2004 | Gao et al. | 370/338 |
| 2004/0107234 | A1* | 6/2004 | Rajahalme | 709/200 |
| 2004/0202132 | A1* | 10/2004 | Heinonen et al. | 370/331 |
| 2005/0243766 | A1* | 11/2005 | Tsirtsis et al. | 370/328 |

* cited by examiner

*Primary Examiner*—George Eng
*Assistant Examiner*—Michael Faragalla
(74) *Attorney, Agent, or Firm*—Oblon, Spivak, McClelland, Maier & Neustadt, P.C.

(57) ABSTRACT

A communication system includes a MN for transmitting a request for information which specifies a MAP to be used for packet reception and anycast address regarding a plurality of MAPs to a given AR connected to the MN, routers for transmitting the request to a MAP which has a shortest distance from the given AR based on the anycast address transmitted from the given AR, and each of the MAPS for transmitting the information which specifies the MAP to the MN.

13 Claims, 24 Drawing Sheets

FIG. 3

| BU DESTINATION | ADDRESS | TRANSMISSION TIMER VALUE |
|---|---|---|
| MAP | ANYCAST ADDRESS REGARDING PLURALITY OF MAP'S | $\alpha 1(32)$ |
| HA | IP ADDRESS OF HA | $\alpha 2(245)$ |

FIG. 5

| RCoA | LCoA |
|---|---|
| RCoA1<br>RCoA2<br>.<br>.<br>. | LCoA1<br>LCoA2<br>.<br>.<br>. |

FIG. 6

```
 0                   1                   2                   3
 0 1 2 3 4 5 6 7 8 9 0 1 2 3 4 5 6 7 8 9 0 1 2 3 4 5 6 7 8 9 0 1
                                +-+-+-+-+-+-+-+-+-+-+-+-+-+-+-+-+
                                |   Type = 7    |  Length = 16  |
+-+-+-+-+-+-+-+-+-+-+-+-+-+-+-+-+-+-+-+-+-+-+-+-+-+-+-+-+-+-+-+-+
|                                                               |
+                                                               +
|                                                               |
+                             RCoA                              +
|                                                               |
+                                                               +
|                                                               |
+-+-+-+-+-+-+-+-+-+-+-+-+-+-+-+-+-+-+-+-+-+-+-+-+-+-+-+-+-+-+-+-+
```

MOBILE NODE FOR TRANSMITTING A REQUEST FOR INFORMATION WHICH SPECIFIES A TRANSFER DEVICE TO BE USED

CROSS REFERENCE TO RELATED APPLICATIONS

This application is based upon and claims the benefit of priority from the prior Japanese Patent Applications No. P2003-50017, filed on Feb. 26, 2003; the entire contents of which are incorporated herein by reference.

BACKGROUND OF THE INVENTION

1. Field of the Invention

The present invention relates to a communication system, a mobile terminal and a transfer device.

2. Description of the Related Art

Studies have recently been conducted on a mobility management system called a hierarchical mobile IPv6 (HMIP). According to this control system, there is a transfer device (mobility manager) which performs control to so that a packet can reach a mobile terminal even if a mobile terminal moves. The transfer device executes transferring or buffering of a packet addressed to the mobile terminal. According to the control system, there are a plurality of access router devices, connected to the mobile terminal, and a plurality of transfer devices at different places in a network. Thus, the mobile terminal need to figure out a transfer device closest to the access router device connected to the mobile terminal in the network. Incidentally, a second device close to a first device in the network means a device to which the first device can quickly access through the network.

Therewith, the access router device transmits a router ad (router advertisement) to the mobile terminal connected thereto. This router ad (AR) contains information regarding a transfer device closest to the access router device in the network (e.g., information stored in a MAP information option). Then, the mobile terminal acquires the information regarding the transfer devices to figure out the transfer device closest to the access router device connected to the mobile terminal in the network (see "Hierarchical Mobile IPv6" (IETF Internet-draft), (online). Internet (URL http://www.ietf.org/internet-drafts/darft-ietf-mobileip-hmi pv6-0.5. txt)).

However, the aforementioned conventional technology has the following problems. To enable transmission of the router ad (router ad containing information regarding the transfer device closest thereto in the network) by each access router device, the following setting is necessary in the access router device. That is, information (e.g., address) regarding the transfer device closest to each of all the access router devices in the network must be set in the access router device.

Thus, for each installation of a new transfer device or a new access router device in the network, in the access router device, it is necessary to perform processing for setting information regarding a transfer device closest thereto in the network. Consequently, a load imposed to maintain the communication network becomes large.

Additionally, a fixed relation is established (fixed relation caused by the aforementioned setting) between the access router device and the transfer device. When a transfer device is added or deleted in the network, the fixed relation must be changed to enable transmission of appropriate information regarding the transfer device to the mobile terminal by the access router device. Consequently, it is necessary to change setting of all the access router devices close to the transfer device in the network.

Furthermore, if there is an access router device in which no information regarding a transfer device is set, a mobile terminal connected to the access router device cannot figure out a transfer device closest thereto in the network.

BRIEF SUMMARY OF THE INVENTION

Objects of the present invention are to provide a communication system, a mobile terminal and a transfer device, in which no information regarding a transfer device closest in a network is set for all access router devices, and a mobile terminal can acquire information regarding a transfer device (information regarding the transfer device closest to an access router device connected to the mobile terminal in the network).

The present invention is a communication system which includes: a plurality of transfer devices for transferring packets to a current location of a mobile terminal, a plurality of access router devices arranged in a network to be able to connect to the mobile terminal, and the mobile terminal connected to an access router device to receive the packets from a transfer device through the access router device, the system comprising: a first transmitter for transmitting a request for information which specifies a transfer device used by the mobile terminal for packet reception and anycast address which indicates address regarding the plurality of transfer devices, to the access router device connected to the mobile terminal; a second transmitter for transmitting the request to a transfer device which has a shortest distance from the access router device on the network among the plurality of transfer devices, based on the anycast address relayed to be transmitted through the access router device; and a third transmitter provided at the transfer device for transmitting the information which specifies the transfer device to the mobile terminal based on the request.

BRIEF DESCRIPTION OF THE SEVERAL VIEWS OF THE DRAWINGS

FIG. 3 is a view showing an example of binding list information of the Embodiment 1.

FIG. 5 is a view showing an example of a binding table of the Embodiment 1.

FIG. 6 is a view showing an example of RCoA option format of the Embodiment 1.

DETAILED DESCRIPTION OF THE INVENTION

Figure 1:
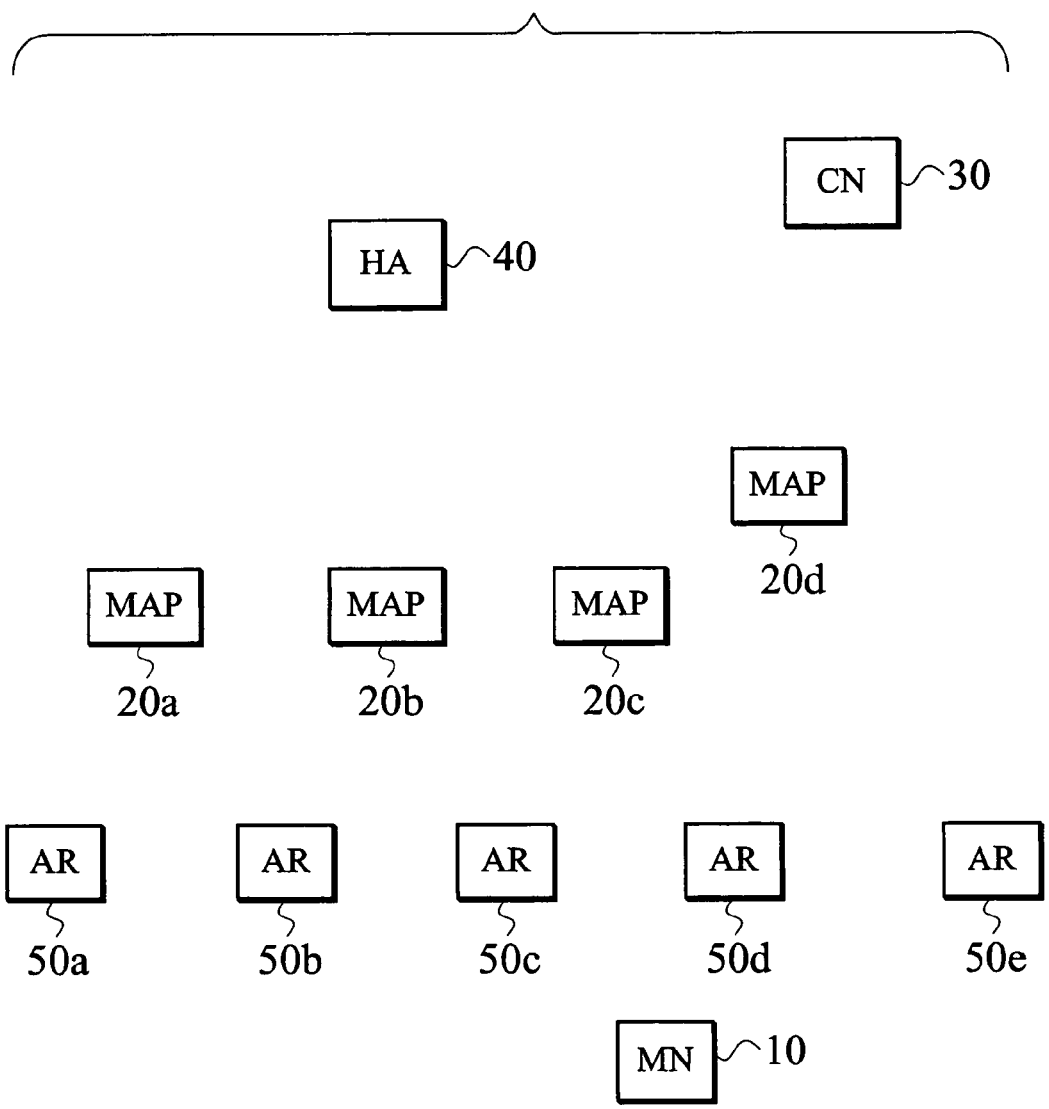
FIG. 1 is a view showing a configuration of a communication system of Embodiment 1.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as it is conventional in the representation of devices, it will be appreciated that the various drawings are not drawn to scale from one figure to another nor inside a given figure.

In the following descriptions, numerous specific details are set fourth such as specific signal values, etc. to provide a thorough understanding of the present invention. However, it will be obvious to those skilled in the art that the present invention may be practiced without such specific details. In other instances, well-conventional circuits have been shown in block diagram form in order not to obscure the present invention in unnecessary detail.

EMBODIMENT 1

FIG. 1 is a view showing the configuration of a communication system of the embodiment. The communication system includes a mobile terminal (hereinafter, referred to as MN) 10, a plurality of transfer devices (mobility anchor points: referred to as MAP hereinafter) 20a to 20d which transfer packets to a current location of the MN 10, a communication opponent device (hereinafter, referred to as CN) 30 which transmits a packet to the MN 10, a home agent device (hereinafter, referred to as HA) 40, a plurality of access router devices (hereinafter, referred to as AR) 50a to 50e to be able to connect to the MN 10 arranged in a network, and a plurality of routers (not shown in FIG. 1).

Note that, in the Embodiments 1 and 2, a BU packet (described later) from the MN10 to the MAP means a request for information which specifies an MAP to be used by the MN 10 for packet reception. BA (described later) from the MAP to the MN 10 means a response to the request for the information which specifies the MAP.

(Configuration of MN)

Figure 2:
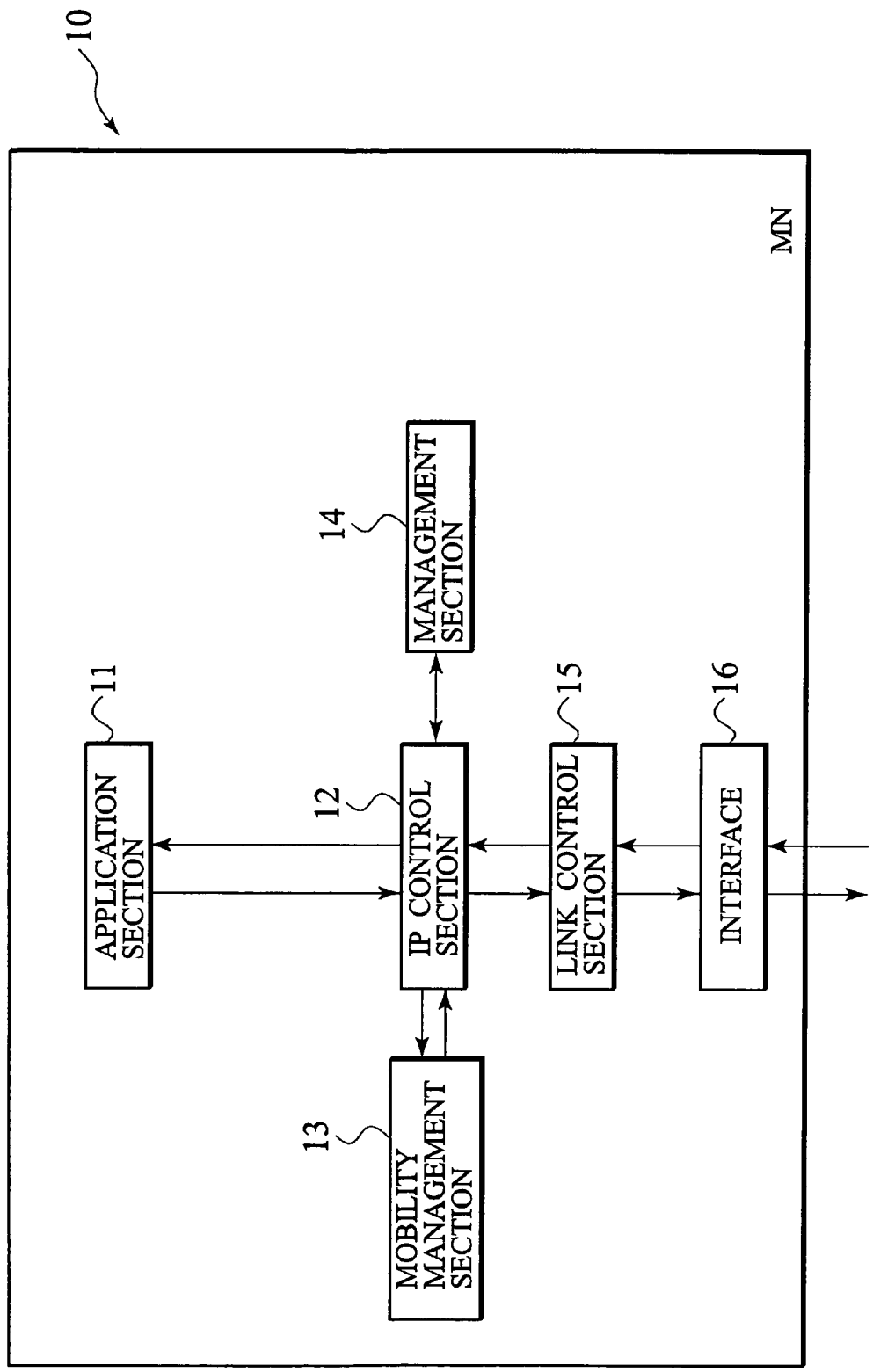
FIG. 2 is a view showing a configuration of a mobile terminal of the Embodiment 1.

The MN 10 is connected to the AR to receive a packet from the MAP therethrough. The MN 10 establishes a radio link among the ARs 50a to 50e to interconnect them. The MN 10 transmits/receives a packet among the MAPs 20a to 20d (CN 30) through the ARs 50a to 50e. FIG. 2 is a view showing the configuration of the MN 10.

The MN 10 includes an application section 11, an IP control section 12, a mobility management section 13, a management section 14, a link control section 15, and an interface 16. An application is installed in the application section 11. The application section 11 sends data to the IP control section 12 and acquires data from the IP control section 12.

The IP control section 12 performs control at an IP level. The IP control section 12 adds an IP header to the data acquired from the application section 11 and sends the data to the link control section 15. The IP control section 12 removes the IP header added to the data acquired from the link control section 15 and sends the data to the application section 11.

The link control section 15 performs control at a data link level. For example, the link control section 15 adds a data link header to the data sent from the IP control section 12 and sends the data to the interface 16. Then, the link control section 15 removes the data link header added to the data acquired from the interface 16 and sends the data to the IP control section 12. Meanwhile, a procedure of checking sequence numbers at the link control section 15 is carried out as in the case of a procedure of checking sequence numbers at a link control section (not shown) arranged in the ARs 50a to 50e. Additionally, the link control section 15 executes control processing of transmission of repeat request for a packet lost during radio communication.

The interface 16 transmits/receives a packet to/from the CN 30 through the MAPs 20a, 20b and the HA 40. The interface 16 establishes a radio link among the ARs 50a to 50e. Then, the interface 16 transmits/receives a packet to/from the MAPs 20a to 20d through the ARs 50a to 50e. Additionally, the interface 16 transmits a packet acquired from the link control section 15 to the AR. The interface 16 sends the packet relayed to be transmitted from the AR to the link control section 15.

Next, a description will be given of a function of each section regarding mobility management which enables the MN 10 to receive a packet transmitted from the CN 30 even if the MN 10 is moved.

The IP control section 12 generates an on-link care of address (hereinafter, referred to as LCoA) which indicates a location of a current location of the MN 10. The IP control section 12 acquires a router ad (RA) from the AR interconnected by establishing a radio link through the interface 16 or the like. This router ad contains a network prefix of the link provided by the ARs.

Then, the IP control section 12 generates LCoA based on the acquired network prefix of the link and a host specification section intrinsic to the MN 10. Subsequently, the IP control section 12 sends the generated LCoA to the management section 14. Note that the IP control section 12 and the mobility management section 13 hold HoA (home address) allocated to the MN 10.

Additionally, the IP control section 12 acquires a binding update response packet (response packet indicating response to a later-described BU packet: the response packet is referred to as a BA packet hereinafter) sent from the MAPs 20a to 20d through the AR, the interface 16, or the like. The BA packet contains a regional care-of address (RCoA). Note that the BA packet will be detailed in a description of the configurations of the MAP and HA 40.

The IP control section 12 acquires transmitted information (RCoA) to specify the MAP as information specifying an MAP to be used for packet reception. This RCoA contains a network prefix (information to specify a network in which the MAP is present) of an IP address of the MAP which has transmitted the BA to the MN 10. Then, the IP control section 12 sends the acquired RCoA to the management section 14. Additionally, the IP control section 12 sends the IP address (source IP address) of the MAP provided to the BA to the management section 14.

Further, when information indicating a change in the RCoA or an address change in the MAP and information indicating a change in the LCoA are sent from the management section 14, the IP control section 12 sends the information to the mobility management section 13. Similarly, when information indicating no change in the RCoA or no address change in the MAP and information indicating no change in the LCoA are sent from the management section 14, the IP control section 12 sends the information to the mobility management section 13.

The management section 14 manages the on-link care of address (LCoA) which indicates the location of the current location of the MN 10, and information (the RCoA and the IP address of the MAP) which specifies an MAP to be currently used for packet reception. A specific management process by the management section 14 is as follows. The management section 14 holds the LCoA sent from the IP control section 12 as the on-link care of address (LCoA) which indicates the location (current location) of the current location of the MN 10. The management section 14 acquires the LCoA sent from the IP control section 12 to determine whether the obtained LCoA is different from the held LCoA. When coincidence is determined, information indicating the coincidence is sent to the IP control section 12. When a difference is determined, the management section 14 sends information indicating a change in the LCoA to the IP control section 12 and rewrites the held LCoA with a new LCoA sent from the IP control section 12. Note that the case where the information indicating the change in the LCoA is sent to the IP control section 12 is a case where the MN 10 performs processing of switching the AR to be connected to the MN 10 by handoff.

The management section 14 holds the RCoA and the IP address of the MAP sent from the IP control section 12 as information which specifies an MAP to be currently used for packet reception. Subsequently, the management section 14 acquires the RCoA sent from the IP control section 12 to determine whether the obtained RCoA is different from the held RCoA. Note that, the management section 14 may obtain the IP address of the MAP sent from the IP control section 12 to determine whether the obtained IP address of the MAP is different or not from the held IP address of the MAP.

If coincidence is determined, information indicating the coincidence is sent to the IP control section 12. If a difference is determined, the management section 14 sends information indicating a change in the RCoA and a change in the IP address of the MAP to the IP control section 12 and rewrites the held RCoA and held IP address of the MAP with a new RCoA and a new IP address of the MAP sent from the IP control section, respectively. Note that, in the communication system of the embodiment, the IP control section 12 may have a function of the management section 14, without providing the management section 14.

The interface 16 transmits to the AR connected to the MN 10 a request for information which specifies an MAP to be used for packet reception, and anycast address which indicates address regarding the plurality of MAPs. Specifically, the interface 16 transmits instruction information which instructs the MAP to execute packet transmission processing based on the on-link care of address (LCoA) of the MN 10, and anycast address which indicates address regarding the plurality of MAPs 20a to 20d to the AR connected to the MN 10.

For example, the interface 16 transmits, to the AR connected to the MN 10, a packet (binding update packet: hereinafter, referred to as BU packet) containing instruction information which instructs the MAP to execute packet transmission processing based on a correspondence between the on-link care of address (LCoA) of the MN 10 and a predetermined regional care-of address (RCoA), and the anycast address which indicates the address regarding the plurality of MAPs 20a to 20d. In this event, the interface 16 executes the transmission processing at each time interval shorter than a first fixed period of time. A detail of the processing is described below.

Here, for example, the first fixed period of time is defined as follows. An interface 27 of the MAPs 20a to 20d finishes packet transmission processing which is based on a correspondence between the LCoA and the RCoA if no BU packet is acquired in the first fixed period of time (expiration of binding information). Such a BU packet contains information which instructs the MAP to execute packet transmission processing based on the correspondence between the LCoA and the RCoA.

The mobility management section 13 holds binding list information. FIG. 3 is a view showing an example of binding list information. In this binding list information, information indicating a destination device of the BU packet, a destination address and a transmission timer value are associated.

In FIG. 3, for example, information (MAP) indicating the destination device of the BU packet is related with the anycast address regarding the plurality of MAPs and a transmission timer value $\alpha 1$ (time shorter than the first fixed period of time: e.g., 32 timer value). Additionally, information (HA) indicating the destination device of the BU packet is related with an IP address of the HA 40 and a transmission timer value $\alpha 2$ (time shorter than a second fixed period of time, described later: e.g., 245 timer value). Note that the management section 14 may be adapted not to manage the IP address of the MAP which the MN 10 uses for current packet reception. The IP address may be recorded in the binding list information.

The mobility management section 13 has a function of measuring time to determine whether time corresponding to the transmission timer value $\alpha 1$ has elapsed. Upon determination of the passage of time corresponding to the transmission timer value $\alpha 1$, the mobility management section 13 acquires the anycast address regarding the plurality of MAPs recorded in the binding list information. The mobility management section 13 acquires the RCoA and the LCoA currently managed by the management section 14 through the IP control section 12.

Then, the mobility management section 13 generates the following BU packet. This BU packet contains information which instructs the MAP to execute packet transmission processing based on the correspondence between the RCoA and the LCoA. Generation processing of the BU packet by the mobility management section 13 is detailed as follows.

The mobility management section 13 sets the acquired LCoA as a source address of the BU packet, the anycast address regarding the plurality of MAPs as destination addresses of the BU packet, and the acquired RCoA as a home address option header of the BU packet. Subsequently, the mobility management section 13 generates the BU packet by adding the source address, the destination address, and the home address option header, to the information which instructs the MAP to execute packet transmission processing based on the correspondence between the source address (i.e., LCoA) and the address (i.e., RCoA) stored in the home address option header.

The mobility management section 13 sends the generated BU packet to the interface 16. The interface 16 transmits the received BU packet to the AR connected to the MN 10. Then, the mobility management section 13 determines whether time corresponding to the transmission timer value α1 has elapsed again. Thereafter, the aforementioned processing is repeated. Note that the determination as to the passage of time corresponding to the transmission timer value may be executed by, for example, the following method. The mobility management section 13 sets an initial value of the timer value equal to a transmission timer value recorded in the binding list information. Subsequently, the mobility management section 13 decrements the timer value every second. Then, when the timer value becomes 0, the mobility management section 13 determines that the time corresponding to the transmission timer value has elapsed, and sets the timer value to the initial value (the transmission timer value recorded in the binding list information) again.

Further, the interface 16 transmits the following BU packet to the HA 40 through the AR. The BU packet contains information which instructs the HA 40 to execute packet transmission processing based on a regional care-of address (RCoA) of the MN 10. In this event, the interface 16 executes the transmission processing at each time interval shorter than the second fixed period of time. A detail of the processing is described as follows.

Here, for example, the second fixed period of time is defined as follows. An interface 46 of the HA 40 finishes packet transmission processing which is based on a correspondence between the HoA and the RCoA when no predetermined BU packet is acquired in the second fixed period of time (expiration of binding information) by the interface 46. Such a predetermined BU packet contains information which instructs the HA to execute packet transmission processing based on the correspondence between the HoA and the RCoA.

The mobility management section 13 has a function of measuring time to determine whether time corresponding to a transmission timer value α2 has elapsed. Upon determination of the passage of time corresponding to the transmission timer value α2, the mobility management section 13 acquired the IP address of the HA 40 recorded in the binding list information. Then, the mobility management section 13 acquired the RCoA and the HoA currently managed by the management section 14 through the IP control section 12. Subsequently, the mobility management section 13 generates the following BU packet. This BU packet contains information which instructs the HA 40 to execute packet transmission processing based on the correspondence between the RCoA and the HoA acquired by the mobility management section 13. Generation processing of the BU packet by the mobility management section 13 is detailed as follows.

The mobility management section 13 sets the RCoA as a source address of the BU packet, the IP address of the HA 40 as a destination address of the BU packet, and the HoA as a home address option header of the BU packet. Subsequently, the mobility management section 13 generates the BU packet by adding the source address, the destination address and the home address option header, which have been set, to the information which instructs the HA 40 to execute packet transmission processing based on the correspondence between the source address (i.e., RCoA) and the address (i.e., HoA) stored in the home address option header. The mobility management section 13 sends the generated BU packet to the interface 16. The interface 16 transmits the received BU packet to the HA 40. Then, the mobility management section 13 determines whether time corresponding to the transmission timer value α2 has elapsed again. Thereafter, the aforementioned processing is repeated.

The interface 16 executes the following processing when the on-link care of address (LCoA) managed by the management section 14 is changed. The interface 16 transmits information, which instructs execution of packet transmission processing based on the changed LCoA to the MAP, based on information to specify a MAP currently managed by the management section 14. Specifically, upon the change in the LCoA managed by the management section 14, the interface 16 executes the following processing. That is, the interface 16 transmits, to the MAP, a BU packet, which contains information to instruct execution of packet transmission processing based on a correspondence between the changed LCoA and the RCoA currently managed by the management section 14, based on the IP address of the MAP currently managed by the management section 14. A detail of the processing is described below.

Information indicating a change in the LCoA is sent from the IP control section 12 to the mobility management section 13. The mobility management section 13 acquires the RCoA and the IP address of the MAP managed by the management section 14 and the changed LCoA through the IP control section 12. Then, the mobility management section 13 generates a BU packet containing information which instructs the MAP to execute packet transmission processing based on a correspondence between the acquired RCoA and the changed LCoA, and sends the BU packet to the interface 16. A detail of generation processing of the BU packet by the mobility management section 13 is as follows.

The mobility management section 13 sets the changed LCoA as a source address of the BU packet, the IP address of the MAP as a destination address of the BU packet, and the acquired RCoA as a home address option header of the BU packet. The mobility management section 13 generates the BU packet by adding the source address, the destination address and the home address option header, which have been set, to the information which instructs the MAP to execute packet transmission processing based on the correspondence between the source address (i.e., changed LCoA) and the address (i.e., RCoA) stored in the home address option header. The mobility management section 13 sends the generated BU packet to the interface 16. The interface 16 transmits the received BU packet to the MAP.

After the execution of the transmission processing by the interface 16, the interface 16 transmits a predetermined BU packet to the AR connected to the MN 10 periodically (at each time interval shorter than the first fixed period of time) as described above. The predetermined BU packet contains information which instructs the MAP to execute packet transmission processing based on the correspondence between the LCoA and the RCoA, and the anycast address which indicates the address regarding the plurality of MAPs 20a to 20d.

The interface 16 executes the following processing when the RCoA and the IP address of the MAP managed by the management section 14 are changed. The interface 16 transmits, to the HA 40 based on the IP address thereof, information which instructs execution of packet transmission processing based on the changed RCoA. Specifically, when the RCoA and the IP address of the MAP managed by the management section 14 are changed, the interface 16 executes the following processing. The interface 16 transmits, to the HA 40 based on the IP address thereof, a BU packet which contains information to instruct execution of packet transmission processing based on a correspondence between the changed RCoA and the HoA.

For example, when the MN 10 acquires a BA packet which contains RCoA different from that currently managed by the management section 14 from the MAP, the interface 16 executes the aforementioned transmission processing. A detail of the processing is described below.

Information indicating a change in the RCoA and a change in the IP address of the MAP is sent from the IP control section 12 to the mobility management section 13. The mobility management section 13 acquires the changed RCoA from the management section 14 through the IP control section 12. Additionally, the mobility management section 13 acquires the IP address of the HA 40 based on the binding list information. Then, the mobility management section 13 generates a BU packet containing information which instructs the HA 40 to execute packet transmission processing based on a correspondence between the acquired RCoA and the HoA, and sends the BU packet to the interface 16. A detail of generation processing of the BU packet is as follows.

The mobility management section 13 sets the acquired RCoA as a source address of the BU packet, the IP address of the HA 40 as a destination address of the BU packet, and the acquired HoA as a home address option header of the BU packet. The mobility management section 13 generates the BU packet by adding the source address, the destination address, and the home address option header, which have been set, to the information which instructs the HA 40 to execute packet transmission processing based on the correspondence between the source address (i.e., RCoA) and the address (i.e., HoA) stored in the home address option header. The mobility management section 13 sends the generated BU packet to the interface 16. The interface 16 transmits the received BU packet to the HA 40.

Note that the interface 16 receives the BA packet transmitted from the MAP, and the BA packet transmitted from the HA 40. For example, when a request for information which specifies an MAP to be used for packet reception is transmitted to a MAP, which has the shortest distance from the AR on the network, among the plurality of MAPs based on anycast address relayed to be transmitted through the AR, the interface 16 receives from the MAP the information specifying the MAP. Specifically, when instruction information (information which instructs the MAP to execute packet transmission processing based on the on-link care of address (LCoA) of the MN 10) is transmitted to a MAP, which has the shortest distance from the AR on the network, among the plurality of MAPs based on the anycast address relayed to be transmitted through the AR, the interface 16 receives from the MAP the information specifying the MAP.

Further, in the case where the predetermined regional care-of address (RCoA) contains no information to specify a network where a MAP which has the shortest distance from the AR on the network, among the plurality of MAPs, is present when the instruction information is transmitted to the MAP based on the anycast address relayed to be transmitted through the AR, the IP control section 12 acquires a regional care-of address (RCoA) which has been transmitted from the MAP as information which specifies a transfer device to be used for packet reception. The regional care-of address (RCoA) contains information to specify a network in which the MAP is present.

In this event, the instruction information instructs the MAP to execute packet transmission processing based on a correspondence between the on-link care of address (LCoA) of the MN 10 and a predetermined regional care-of address (RCoA).

The interface 16 transmits, to the HA 40, the instruction information which instructs execution of packet transmission processing based on the regional care-of address (RCoA) acquired by the IP control section 12.

(Configuration of MAP)

Figure 4:
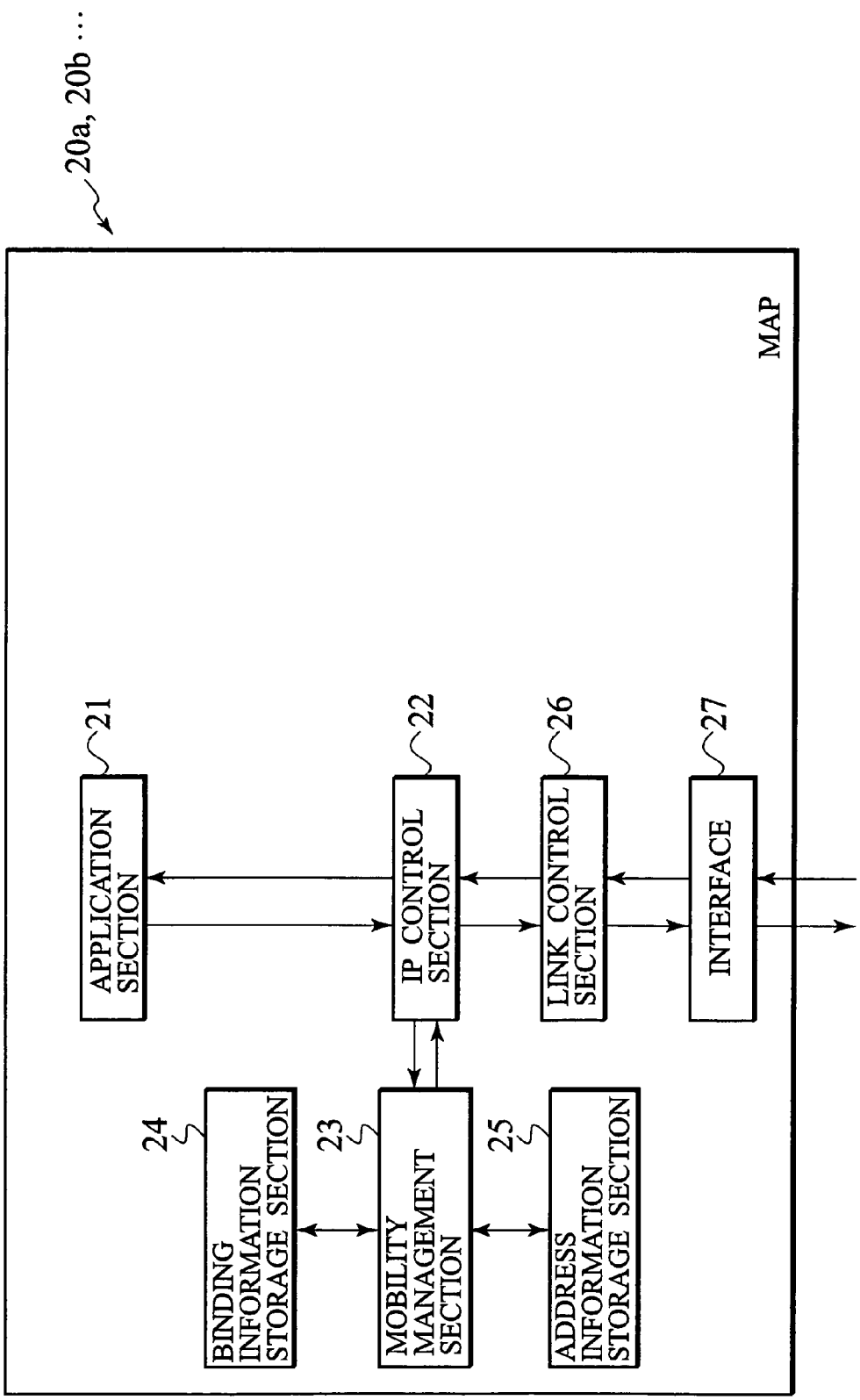
FIG. 4 is a view showing a configuration of a transfer device of the Embodiment 1.

FIG. 4 is a view showing the configuration of each of the MAPs 20a to 20d. Each MAP includes an application section 21, an IP control section 22, a mobility management section 23, a binding information storage section 24, an address information storage section 25, a link control section 26, and an interface 27.

In transmission of data from the application section 21 to the interface 27 through the IP control section 22 and the link control section 26, functions of the respective sections are substantially the same as those of the MN 10 (the application section 11, the IP control section 12, the link control section 15, and the interface 16). Additionally, in transmission of data from the interface 27 to the application section 21 through the link control section 26 and the IP control section 22, functions of the respective sections are substantially the same as those of the MN 10 (the application section 11, the IP control section 12, the link control section 15, and the interface 16).

Next, a description will be given of a function of each section regarding mobility management which enables the MN 10 to receive a packet transmitted from the CN 30 even when the MN 10 is moved.

The interface 27 transmits information which specifies an MAP to the MN 10 based on a BU packet (request). Specifically, in accordance with the BU packet (the instruction information), the interface 27 of an MAP (MAP having the shortest distance from AR on a network) executes packet transmission processing based on LCoA of the MN 10, and transmits a.BA packet which contains information (e.g., RCoA) to specify the MAP to the MN 10.

The interface 27 transmits a packet, transmitted from the CN 30 (HA 40) and addressed to the MN 10, to the AR based on an on-link care of address (LCoA) which indicates a location of a current location of the MN 10. Specifically, the interface 27 transmits the packet, transmitted from the CN 30 (HA 40) and addressed to the MN 10, to the AR based on a correspondence between the LCoA which indicates the location of the current location of the MN 10 and RCoA (regional care-of address) which contains information to specify a network in which the MAP is present. A detail of the processing is described below.

The binding information storage section 24 stores a binding table which indicates a correspondence between each RCoA and each LCoA. FIG. 5 is a view showing an example of the binding table. The HA 40 transmits a packet, transmitted from the CN 30 and addressed to the MN 10, to the MAP. The packet contains data, and HoA and RCoA added to the data. The packet is sent to the IP control section 22 through the interface 27.

The IP control section 22 sends the packet to the mobility management section 23 when the RCoA included in the packet contains a network prefix of the IP address of the MAP (e.g., RCoA contained in the packet is recorded on the binding table). The mobility management section 23 refers to the binding table to acquire LCoA corresponding to the RCoA. The mobility management section 23 executes encapsulation processing of the packet by using a header which contains the LCoA.

Then, the mobility management section 23 sends the encapsulated packet to the interface 27 through the IP control section 22. The interface 27 transmits the encapsulated packet (i.e., packet sent based on the correspondence between the LCoA and the RCoA) to the AR based on the LCoA.

When the MN 10 transmits, to the AR connected to the MN 10, a BU packet containing instruction information which instructs the MAP to execute packet transmission processing based on the LCoA (on-link care of address) of the MN 10 and the anycast address which indicates the address regarding the plurality of MAPs, the interface 27 receives the BU packet which contains the instruction information and has been transmitted based on the anycast address.

For example, when the MN 10 transmits, to the AR connected to the MN 10, instruction information which instructs the MAP to execute packet transmission processing based on a correspondence between the LCoA of the MN 10 and predetermined RCoA (regional care-of address), and the anycast address which indicates the address regarding the plurality of MAPs, the interface 27 receives the transmitted instruction information based on the anycast address.

In accordance with the instruction information, the interface 27 executes packet transmission processing based on the LCoA (on-link care of address) of the MN 10 and transmits information which specifies the MAP (e.g., RCoA) to the MN 10.

The address information storage section (address pool section) 25 stores one or a plurality of RCoAs which contain the network prefix of the IP address of the MAP and are not associated with any MN 10. This storage processing is described below. For example, when the RCoA includes the network prefix of the IP address of the MAP and a host specification section, the mobility management section 23 executes the following processing.

The mobility management section 23 generates a plurality of RCoAs based on the network prefix of the IP address of the MAP and the host specification section represented in random numbers. Then, the mobility management section 23 executes processing (duplicate address deletion: DAD) to select one or a plurality of RCoAs (one or a plurality of RCoAs not associated with the MN 10) corresponding to the respective generated RCoAs. Subsequently, the mobility management section 23 stores the selected one or plurality of RCoAs in the address information storage section 25. Thereafter, the mobility management section 23 manages the RCoAs stored in the address information storage section 25. That is, the mobility management section 23 stores predetermined RCoA in the address information storage section 25 or deletes the predetermined RCoA from the address information storage section 25 as necessary.

Subsequently, the interface 27 transmits any selected from the one or plurality of RCoAs stored in the address information storage section (address pool section) 25 as information to specify the MAP.

Additionally, the interface 27 finishes the packet transmission processing when no predetermined BU packet is transmitted in a fixed period of time (the aforementioned first fixed period of time). The predetermined BU packet contains information which instructs the MAP to execute packet transmission processing based on the LCoA. This BU packet contains, for example, information which instructs the MAP to execute packet transmission processing based on a correspondence between the LCoA and the RCoA. A detail of the processing is as follows.

The mobility management section 23 determines whether a BU packet has been transmitted in the fixed period of time (first fixed period of time) for each RCoA of the binding table. The mobility management section 23 executes the following processing when no BU packet has been transmitted in the fixed period of time. The mobility management section 23 deletes the RCoA to which no BU packet has been sent and the LCoA corresponding thereto among pieces of information recorded on the binding table. Thereafter, the interface 27 executes no packet transmission processing based on a correspondence between the LCoA and the RCoA which have been deleted.

Additionally, the IP control section 22 executes the following processing based on the BU packet (BU packet containing information which instructs the MAP to execute packet transmission processing based on the correspondence between the LCoA and the RCoA) transmitted through the interface 27. The IP control section 22 sends the BU packet to the mobility management section 23 when a destination address contained in the BU packet is an IP address allocated to the MAP or anycast address allocated to each of the plurality of MAPs 20a to 20d.

The mobility management section 23 acquires the RCoA contained in the received BU packet. Then, the mobility management section 23 determines whether the network prefix of the IP address of the MAP is included in the acquired RCoA. When the network prefix is determined to be included, the mobility management section 23 recognizes that the BU packet corresponding to the RCoA has been received in the fixed period of time.

For example, when the acquired RCoA is contained in the binding table, the mobility management section 23 recognizes that the BU packet corresponding to the RCoA has been received in the fixed period of time. Subsequently, the mobility management section 23 records, on the binding table, information indicating continuance of the correspondence between the RCoA and the LCoA. Accordingly, the mobility management section 23 determines whether the BU packet corresponding to the RCoA has been received in the fixed period of time again. The interface 27 continues to execute the packet transmission processing based on the correspondence between the RCoA and the LCoA.

On the other hand, when the network prefix of the IP address of the MAP is determined to be not contained in the acquired RCoA, the mobility management section 23 executes the following processing.

That is, when a predetermined RCoA (regional care-of address) does not contain the network prefix of the IP address of the MAP (information to specify a network in which the MAP is present), the mobility management section (correspondence generation section) 23 generates a correspondence between LCoA (an on-link care of address) and any selected from one or a plurality of RCoAs which contain the network prefix of the IP address of the MAP and are not associated with the MN 10.

For example, when the acquired RCoA is determined to be not contained in the binding table, the mobility management section 23 executes the following processing.

The mobility management section 23 acquires one of the plurality of RCoAs stored in the address information storage section 25. The mobility management section 23 (correspondence generation section) generates binding information which indicates a correspondence between the acquired RCoA and the LCoA contained in the received BU packet. Then, the mobility management section 23 writes the generated binding information on the binding table stored in the binding information storage section 24. Accordingly, the interface 27 executes packet transmission processing based on the newly generated binding information (correspondence between the acquired RCoA and the LCoA contained in the received BU packet). Thereafter, the mobility management section 23 determines whether a BU packet corresponding to the RCoA has been transmitted in the fixed period of time.

The interface 27 executes packet transmission processing based on the correspondence generated by the mobility management section 23, and transmits the RCoA contained in the correspondence to the mobile terminal.

The interface 27 transmits information which specifies the MAP (e.g., one of the plurality of RCoAs stored in the address information storage section 25) to the MN 10 based on the BU packet. A detail of the processing is as follows. The mobility management section 23 acquires a source address (LCoA of the MN 10) contained in the BU packet, one of the RCoAs (information to specify the MAP), and the IP address of the MAP. Then, the mobility management section 23 generates a BA packet (binding update acknowledgement) which indicates a response to the BU packet. A detail of generation processing of the BA packet is described below.

The mobility management section 23 sets the IP address of the MAP as a source address of the BA packet, the LCoA of the MN 10 as a destination address of the BA packet, and the one of the RCoAs as an option header of a regional care-of address (RCoA option header). The mobility management section 23 generates a BA packet by adding the source address, the destination address, and the option header of a regional care-of address (RCoA), which have been set, to information indicating binding completion. The generated BA packet is sent to the interface 27. The interface 27 transmits the BA packet to the MN 10 through the AR.

Note that there is no particular limitation on a format of the RCoA option header. FIG. 6 is a view showing an example of a format of the RCoA option header. As shown in FIG. 6, the RCoA option is a mobility option sequent to a binding acknowledgement message of a mobility header, and an option type thereof is 7. The BU packet transmitted from the MN 10 is received by the interface 27.

(HA)

Figure 7:
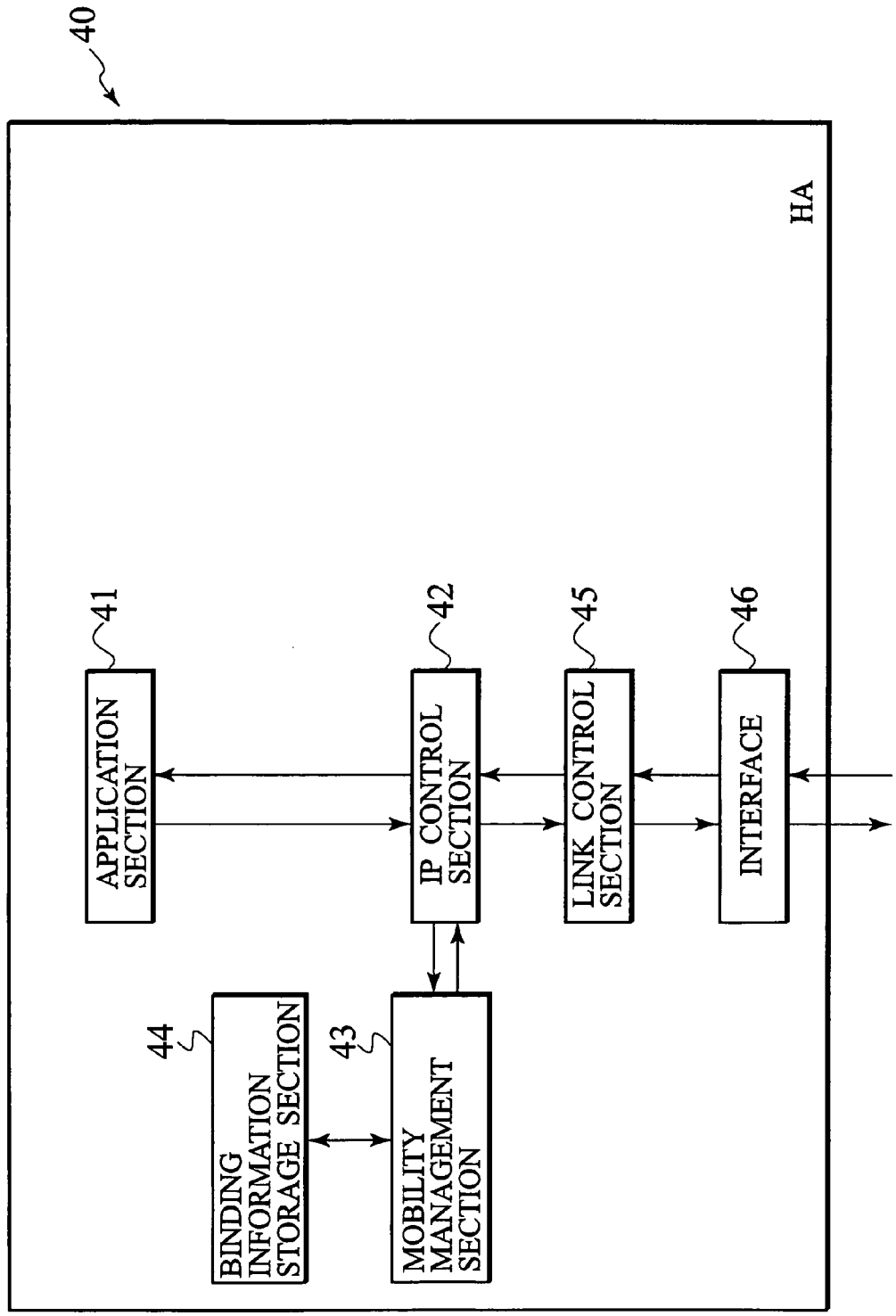
FIG. 7 is a view showing a configuration of a home agent device of the Embodiment 1.

FIG. 7 is a view showing the configuration of the HA 40. The HA 40 includes an application section 41, an IP control section 42, a mobility management section 43, a binding information storage section 44, a link control section 45, and an interface 46. In transmission of data from the application section 41 to the interface 46 through the IP control section 42 and the link control section 45, functions of the respective sections are substantially the same as those of the MN 10 (the application section 11, the IP control section 12, the link control section 15, and the interface 16).

In transmission of data from the interface 46 to the application section 41 through the link control section 45 and the IP control section 42, functions of the respective sections are substantially the same as those of the MN 10 (the application section 11, the IP control section 12, the link control section 15, and the interface 16).

Next, a description will be given of a function of each section regarding mobility management which enables the MN 10 to receive a packet transmitted from the CN 30 even when the MN 10 is moved.

The interface 46 transmits, to the MAP, a packet transmitted from the CN 30 which transmits the packet to the MN 10, based on information which specifies the MAP. For example, the interface 46 transmits, to the MAP, the packet transmitted from the CN 30 which transmits the packet to the MN 10, based on RCoA (a regional care-of address). Meanwhile, the information which specifies the MAP may be an address allocated to the MAP. Then, the interface 46 may transmit, to the MAP, the packet transmitted from the CN 30 which transmits the packet to the MN 10, based on the address of the MAP.

A description will be given by way of example in which the interface 46 transmits, to the MAP, the packet received from the CN 30 based on the regional care-of address (RCoA). The interface 46 transmits the packet received from the CN 30 to the MAP based on a correspondence between HoA and RCoA. A detail of the processing is described below.

The binding information storage section 44 stores a binding table which indicates a correspondence between each HoA and each RCoA. Then, a packet addressed to the MN 10 is sent from the CN 30 to the HA 40. The packet contains data (e.g., payload data), and HoA added to the data. The packet is sent to the IP control section 42 through the interface 46. The IP control section 42 acquires the binding table from the binding information storage section 44 through, for example, the mobility management section 43. The IP control section 42 determines whether the HoA is contained in the binding table. When the HoA is determined to be contained, the IP control section 42 sends the packet to the mobility management section 43. The mobility management section 43 refers to the binding table to acquire RCoA corresponding to the HoA. The mobility management section 43 executes encapsulation processing of the packet by using a header which contains the RCoA.

The mobility management section 43 sends the encapsulated packet to the interface 46 through the IP control section 42. The interface 46 transmits the encapsulated packet to the MAP based on the RCoA contained in the header.

Additionally, the interface 46 finishes the packet transmission processing when no BU packet, containing information which instructs the HA 40 to execute packet transmission processing based on the RCoA, is transmitted in a fixed period of time (the second fixed period of time). The BU packet contains, for example, information which instructs the HA 40 to execute packet transmission processing based on the correspondence between the HoA and the RCoA. A detail of the processing is as follows.

The mobility management section 43 determines whether a BU packet has been transmitted in the fixed period of time (the second fixed period of time) for each HoA recorded on the binding table. The mobility management section 43 executes the following processing when no BU packet corresponding to predetermine HoA has been transmitted in the fixed period of time. The mobility management section 43 deletes the predetermined HoA and the RCoA corresponding thereto from pieces of information recorded on the binding table. Thereafter, the interface 46 executes no packet transmission processing based on a correspondence between the HoA and the RCoA which have been deleted.

Additionally, the IP control section 42 executes the following processing based on the BU packet (BU packet containing information which instructs the HA 40 to execute packet transmission processing based on the correspondence between the HoA and the RCoA) sent through the interface 46.

The IP control section 42 sends the BU packet to the mobility management section 43 when a destination address contained in the BU packet is an IP address allocated to the HA 40.

The mobility management section 43 acquires the HoA contained in the received BU packet. Then, when the acquired HoA is contained in the binding table, the mobility management section 43 recognizes that the BU packet corresponding to the HoA has been received in the fixed period of time. The mobility management section 43 records information indicating continuance of the correspondence between the acquired HoA and the RCoA on the binding table. Subsequently, the mobility management section 43 determines whether the BU packet corresponding to the HoA has been received in the fixed period of time again. Thus, the interface 46 continues to execute the packet transmission processing based on the correspondence between the HoA and the RCoA.

Furthermore, the interface 46 transmits a BA packet, which indicates a response to the BU packet, to the MN 10 based on the BU packet. A detail of the processing is as follows. The mobility management section 43 acquires RCoA added to the BU packet, and the IP address of the HA. The mobility management section 43 generates a BA packet which indicates a response to the BU packet. Specifically, the mobility management section 43 sets the IP address of the HA as a source address, and the RCoA as a destination address. Then, the mobility management section 43 generates a BA packet by adding the source address and the destination address, which have been set, to information indicating binding completion. The generated BA packet is sent to the interface 27. The interface 27 transmits the BA packet to the MN 10 through the MAP and the AR.

(AR)

Each of the ARs 50a to 50e establishes a radio link with the MN 10 to be connected to the MN 10. In the specification, "a first predetermined device is connected to a second predetermined device" means that "the first predetermined device is set to be in a state of being capable of communicating with the second predetermined device." Additionally, each of the ARs 50a to 50e transmits data (e.g., BU packet), sent from the MN 10, to a predetermined MAP through one or more routers. Furthermore, each of the ARs 50a to 50e transmits data (packet, BA packet or the like), sent from the MAP, to the MN 10.

(Router)

A plurality of routers are arranged between the ARs 50a to 50e and the MAPs 20a to 20d on the network. Among the plurality of routes, one or the plurality of routers execute the following transmission processing based on anycast address (anycast address regarding the plurality of MAPs 20a to 20d) contained in the BU packet relayed to be transmitted through the AR. That is, the one or plurality of routers transmit the BU packet (request for information which specifies a MAP to be used for packet reception) to a MAP (e.g., MAP 20a) which has the shortest distance from the AR on the network among the plurality of MAPs 20a to 20d. This BU packet contains instruction information which instructs the MAP to execute packet transmission processing based on the LCoA of the MN 10.

Figure 8:
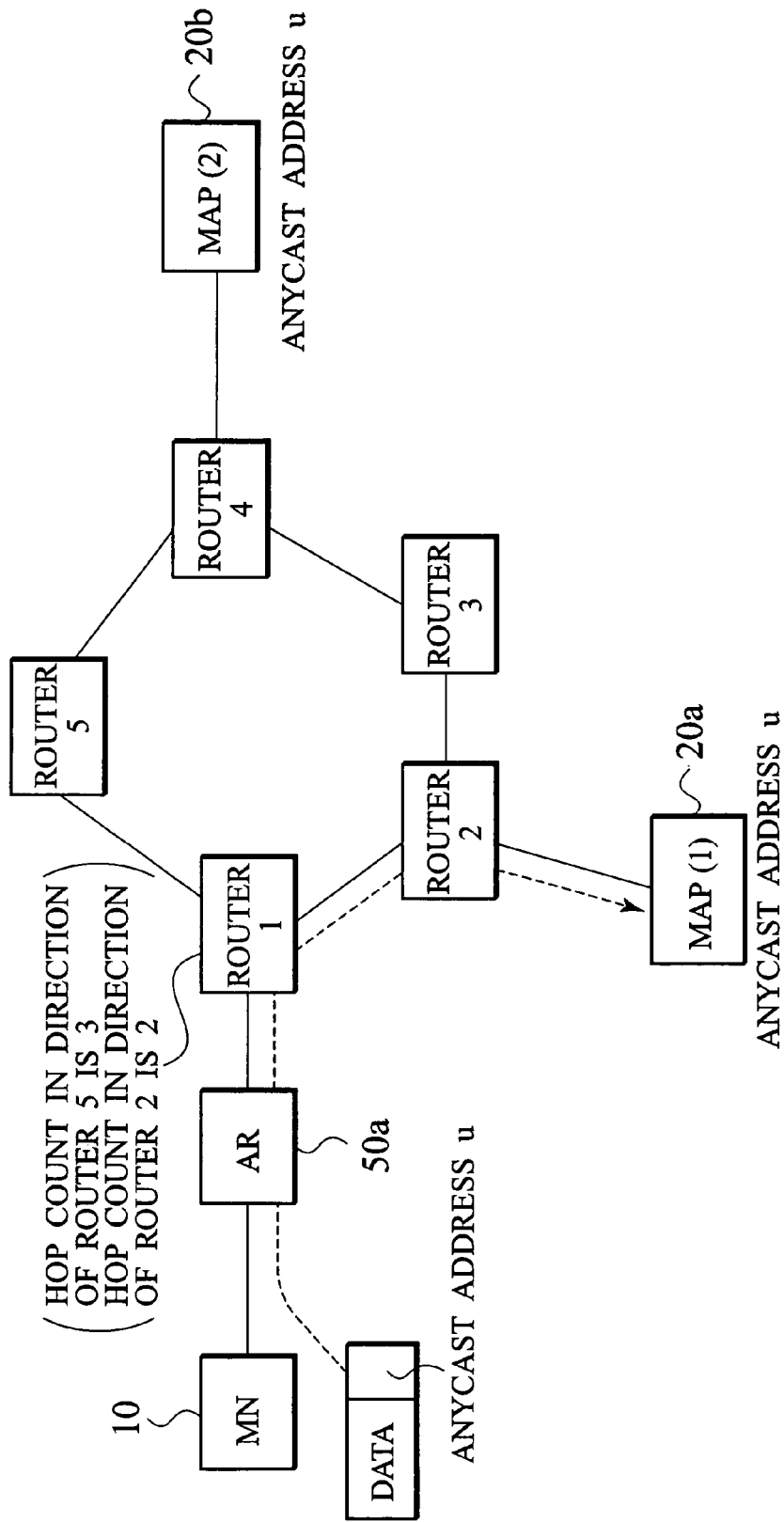
FIG. 8 is a conceptual diagram for explaining anycast transmission which uses a router of the Embodiment 1.

The transmission processing will be described below in detail by referring to FIG. 8. Each of the MAPs 20a to 20d holds an allocated original IP address and an anycast address u. Then, a distance (e.g., number of hops) to a device (MAP) which holds the anycast address on the network is given to each of the routers 1 to 5. This distance is measured based on, e.g., a publicly known path control protocol. Hereinafter, the distance on the network is simply referred to as distance.

For example, the MN 10 transmits data (e.g., BU packet) to which anycast address u regarding the plurality of MAPs 20a to 20d have been added, to the AR 50a. The AR 50a relays and transmits the data to the router 1 connected to the AR 50a.

The router 1 holds information indicating that a hop count through the router 5 is "3" (a hop count to the MAP which holds the anycast address u through the router 5), and information indicating that a hop count through the router 2 is "2" (a hop count to the MAP which holds the anycast address u through the router 2).

To relay and transmit data to the MAP which has the shortest distance to the AR 50a (MN 10), the router 1 relays and transmits the data to the router 2. The router 2 relays and transmits the data to the MAP (1) 20a. Accordingly, the data (e.g., BU packet), to which the anycast address regarding the plurality of MAPs have been added, is sent to the MAP (1) 20a which has the shortest distance to the AR 50a connected to the MN 10.

(CN)

The CN 30 transmits the packet, addressed to the MN 10, to the HA 40. In this event, the packet contains the HoA of the MN 10.

Note that the number of MAPs is not limited to the number of MAPs shown in FIG. 1 and the number of ARs is not limited to the number of ARs shown in FIG. 1.

(Communication Method)

Figure 9:
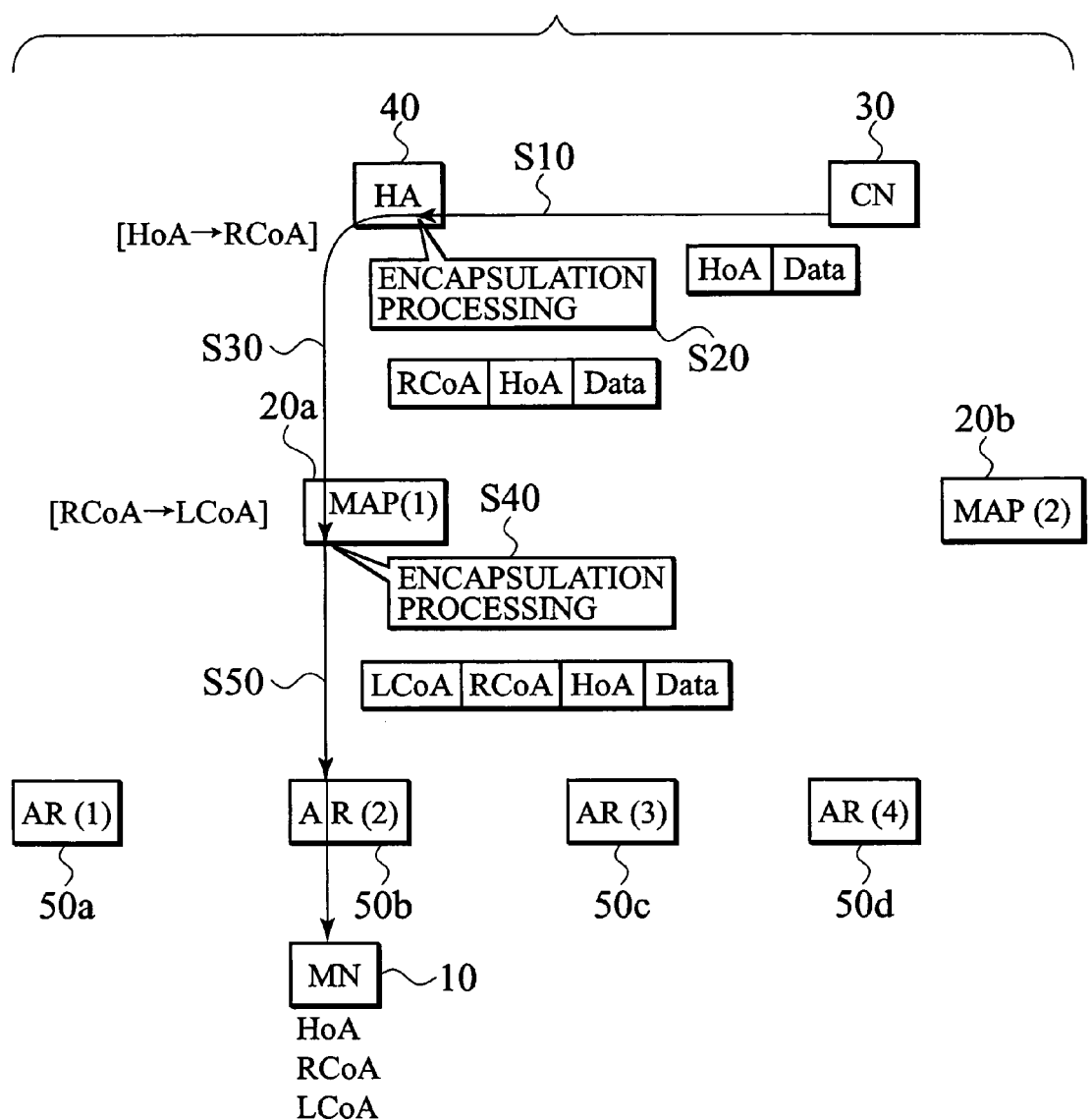
FIG. 9 is a conceptual diagram for explaining a packet transmission method of the Embodiment 1.

FIG. 9 is a conceptual diagram for explaining a method of receiving the packet transmitted from the CN 30 by the MN 10 in the foregoing communication system. The CN 30 transmits, to the HA 40, a packet which has data (e.g., payload data), a destination address (HoA corresponding to the MN 10) added to the data, and a source address (IP address of the CN 30) added to the data (S10).

The IP control section 42 of the HA 40 acquires the packet based on the destination address contained in the packet. The IP control section 42 sends the acquired packet to the mobility management section 43. The mobility management section 43 refers to the binding table to acquire RCoA corresponding to the HoA. The mobility management section 43 executes encapsulation processing for the packet by using a header which contains the RCoA (S20). The interface 46 of the HA 40 transmits the encapsulated packet to the MAP (1) 20a corresponding to the RCoA (S30).

The IP control section 22 of the MAP (1) 20a acquires the packet based on the RCoA contained in the packet. The IP control section 22 sends the acquired packet to the mobility management section 23. The mobility management section 23 refers to the binding table to acquire LCoA corresponding to the RCoA. The mobility management section 23 executes encapsulation processing for the packet by using a header which contains the LCoA (S40). The interface 27 of the MAP (1) 20a transmits the encapsulated packet to the MN 10 (S50) through the AR (2) 50b corresponding to the LCoA.

The IP control section 12 of the MN 10 acquires the HoA, the LCoA and the RCoA contained in the received packet. The IP control section 12 determines whether the acquired HoA, LCoA and RCoA coincide with the HoA, LCoA and RCoA held by the MN 10, respectively. When coincidence is determined, the IP control section 12 acquires the packet. Then, the IP control section 12 recognizes that the packet has been transmitted from the CN 30 based on the source address contained in the acquired packet.

(Transmission Processing of BU Packet, Transmission Processing of BA Packet when MN 10 is Moved)

FIGS. 10 to 16 are conceptual diagrams for explaining transmission processing of a BU packet and a BA packet by using the foregoing communication system when the MN 10 is moved. In this case, a MAP which has the shortest distance to the AR (1) 50a, the AR (2) 50b and the AR (3) 50c is the MAP (1) 20a, and a MAP which has the shortest distance to the AR (4) 50d is the MAP (2) 20b.

Figure 10:
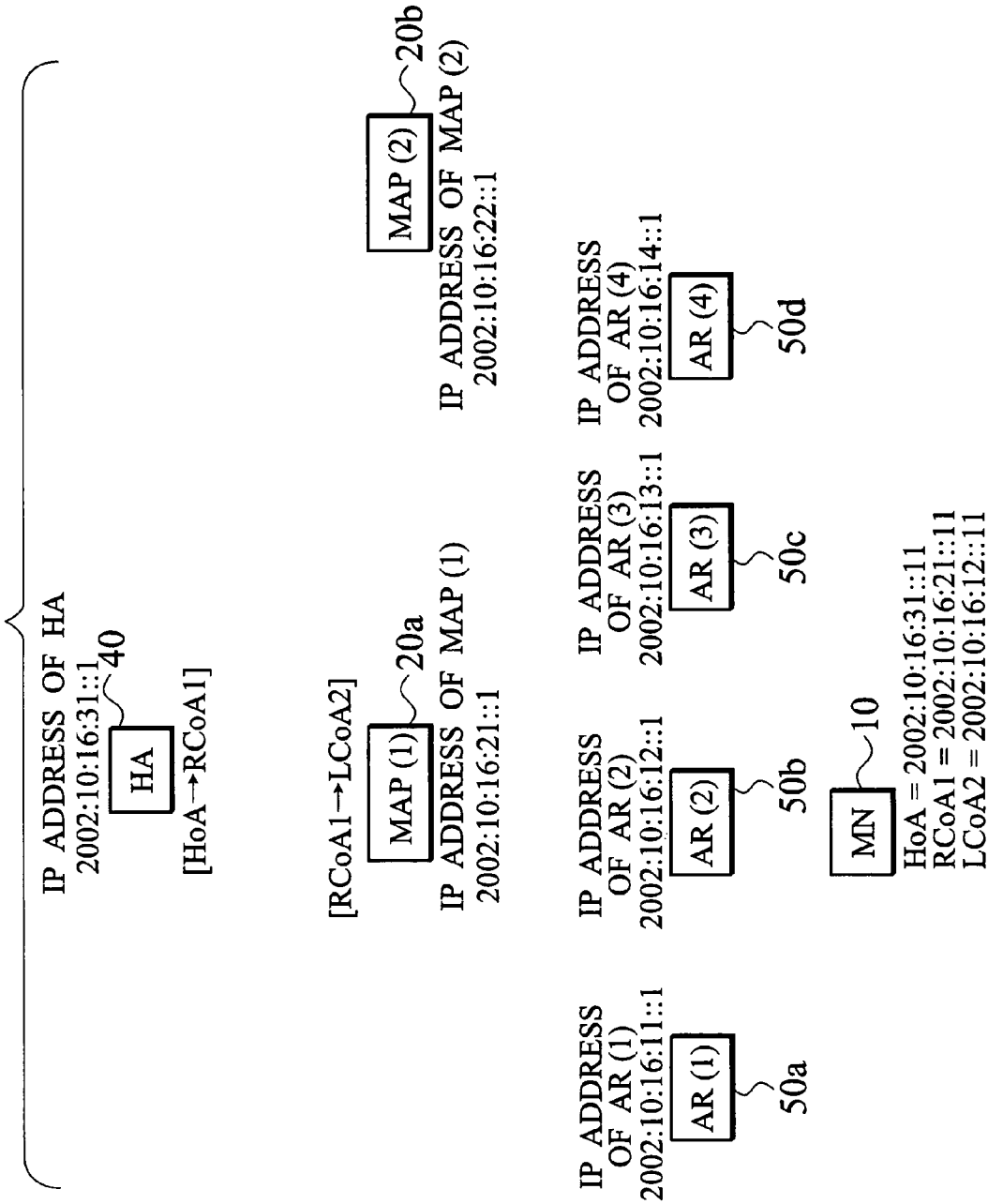
FIG. 10 is a conceptual diagram for explaining a communication method of the Embodiment 1.

An IP address allocated to each device (MAP, HA 40 or the like) is shown in FIG. 10. The MN 10 holds HoA (2002:10:16:31::11) allocated to its own device. The management section 14 of the MN 10 manages LCoA 2 (2002:10:16:12::11), RCoA 1 (2002:10:16:21::11) and the IP address of the MAP (1). Here, when the IP address is "2002:10:16:31::1," "2002:10:16:31::/64" is a network prefix, and "::1" is a host specification section.

Additionally, anycast address regarding the plurality of MAPs are "2002:10:16:20::1." Binding information indicating a correspondence between the HoA and the RCoA 1 is recorded on the binding table stored in the binding information storage section 44 of the HA 40. Binding information indicating a correspondence between the RCoA 1 and the LCoA 2 is recorded on the binding table stored in the binding information storage section 24 of the MAP (1) 20a. Then, a router ad transmitted from each of the AR's 50a to 50d contains no information regarding the MAP which has the shortest distance to the AR.

Figure 11:
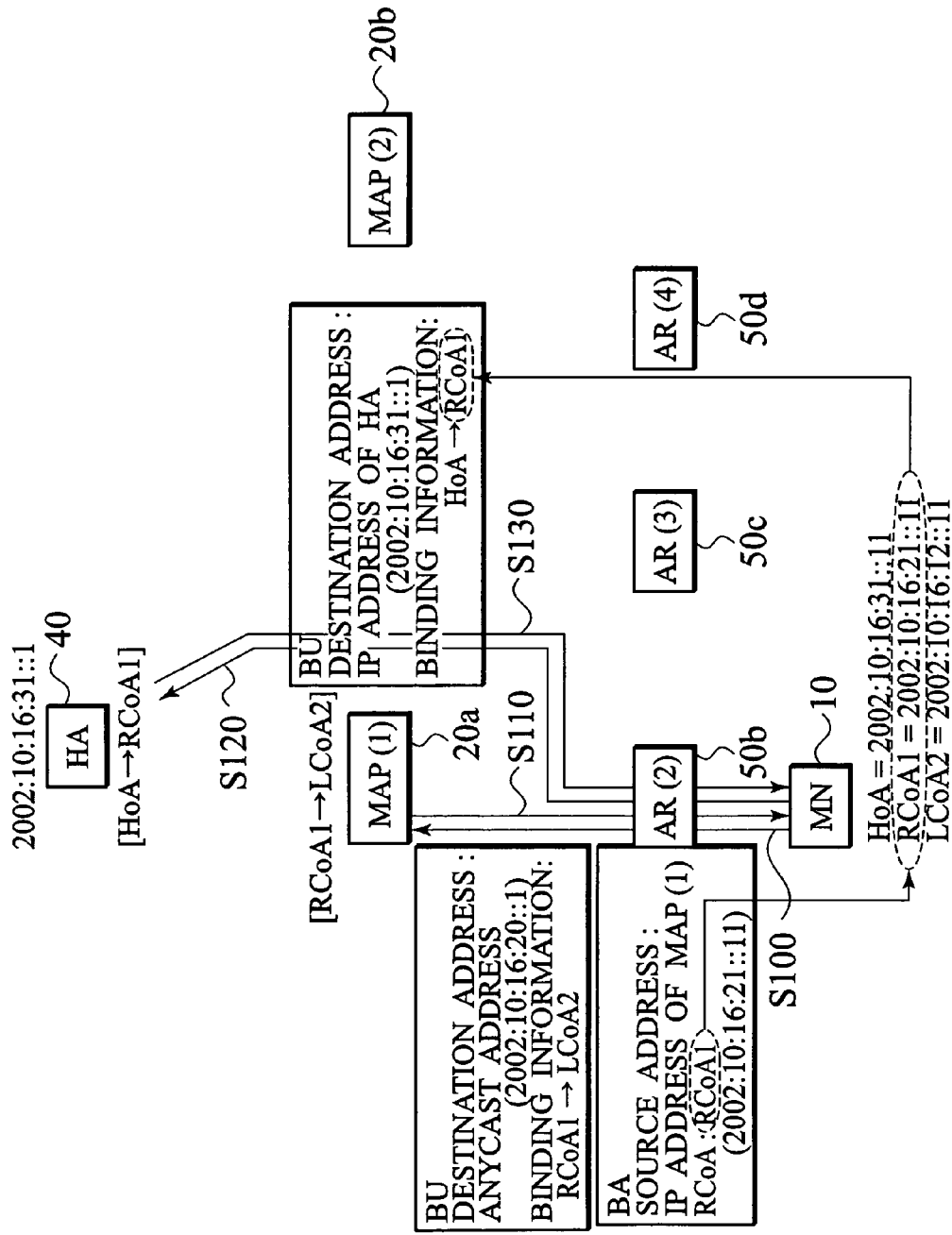
FIG. 11 is a conceptual diagram for explaining a communication method of the Embodiment 1.

FIG. 11 is a conceptual diagram for explaining processing of the MN 10 to periodically transmit a BU packet to the MAP (1) and the HA 40 and processing of the MAP (1) and the HA 40 to transmit a BA packet to the MN 10 when the MN 10 is connected to the AR (2).

The mobility management section 13 of the MN 10 generates a BU packet periodically (at each time interval shorter than the first fixed period of time). This BU packet contains information which instructs the MAP to execute packet transmission processing based on a correspondence between the RCoA 1 and the LCoA 2. In addition, the BU packet contains the anycast address as a destination address. The mobility management section 13 acquires the anycast address based on the binding list information, and the acquired anycast address is contained in the BU packet.

The mobility management section 13 sends the BU packet to the interface 16. The interface 16 sends the BU packet to the AR (2) 50b. The BU packet sent from the AR (2) 50b is transmitted to the MAP (1) 20a which has the shortest distance to the AR (2) 50b through one or a plurality of routers based on the anycast address (S100).

The BU packet is sent to the mobility management section 23 of the MAP (1) 20a. The mobility management section 23 acquires the RCoA 1 contained in the BU packet. When the acquired RCoA 1 is contained in the binding table, the mobility management section 23 recognizes that the BU packet corresponding to the RCoA 1 has been sent in the fixed period of time. According to the embodiment, since the acquired RCoA 1 is contained in the binding table, the mobility management section 23 executes the recognition processing.

The mobility management section 23 records information indicating continuance of the correspondence between the RCoA 1 and the LCoA 2 on the binding table. Subsequently, the mobility management section 23 determines whether the BU packet corresponding to the RCoA 1 has been received in the fixed period of time again.

The mobility management section 23 generates a BA packet which is a response to the BU packet. In this event, the BA packet contains the RCoA 1. The RCoA 1 is stored in a RCoA option header. Additionally, the BA packet contains a source address (IP address of the MAP (1)) and a destination address (LCoA 2). The interface 27 transmits the BA packet to the MN 10 through the AR (2) 50b corresponding to the LCoA 2 (S110).

The BA packet is sent to the IP control section 12 of the MN 10. The IP control section 12 sends the acquired RCoA 1 and the IP address of the MAP (1) to the management section 14. The management section 14 sends information indicating no change in the RCoA or the IP address of the MAP to the IP control section 12. Subsequently, for example, the IP control section 12 may send a BU packet generation instruction for the HA 40 to the mobility management section 13.

The mobility management section 13 generates BU packets periodically (at each time interval shorter than the second fixed period of time). For example, this generation processing may be executed after the mobility management section 13 acquires the generation instruction from the IP control section 12. The BU packet contains information which instructs the HA 40 to execute packet transmission processing based on the correspondence between the HoA and the RCoA 1. Additionally, the BU packet contains the IP address of the HA 40 as a destination address. In this event, the mobility management section 13 acquires the IP address of the HA 40 based on the binding list information. The mobility management section 13 incorporates the acquired IP address of the HA 40 into the BU packet. Then, the mobility management section 13 sends the BU packet to the interface 16. The interface 16 sends the BU packet to the HA 40 (S120).

The BU packet is sent to the mobility management section 43 of the HA 40. When the acquired HoA is contained in the binding table, the mobility management section 43 recognizes that the BU packet corresponding to the HoA has been sent in the fixed period of time. According to the embodiment, since the acquired HoA is contained in the binding table, the mobility management section 43 executes the recognition processing. Then, the mobility management section 43 records information indicating continuance of the correspondence between the acquired HoA and the RCoA 1 on the binding table. Subsequently, the mobility management section 43 determines whether the BU packet corresponding to the HoA has been received in the fixed period of time again.

The mobility management section 43 generates a BA packet which is a response to the BU packet. A source address (IP address of the HA 40) or the like is added to the BA packet. Note that the RCoA 1 recorded on the binding table is stored in the RCoA option header in the BA packet. The interface 46 transmits the BA packet to the MN 10 through the MAP (1) 20a and the AR (2) 50b (S130).

Figure 12:
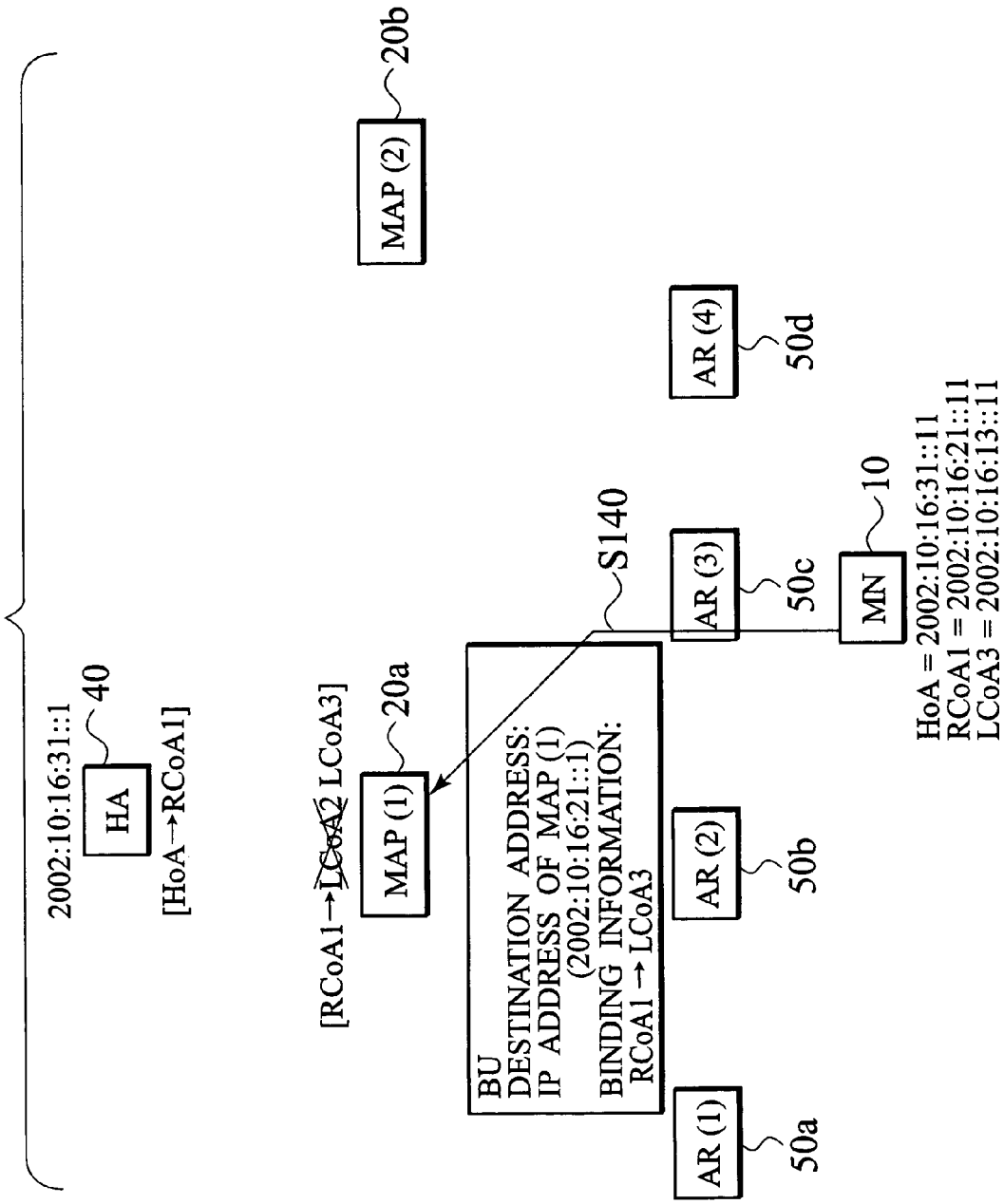
FIG. 12 is a conceptual diagram for explaining a communication method of the Embodiment 1.

FIG. 12 is a conceptual diagram for explaining transmission processing executed immediately after the MN 10 is moved to switch a connection opponent from the AR (2) 50b to the AR (3) 50c.

The management section 14 of the MN 10 manages new LCoA 3 and sends information indicating a change in the LCoA to the mobility management section 13. The mobility management section 13 acquires information managed by the management section 14 (i.e., RCoA 1, IP address of the MAP (1), LCoA 3) through the IP control section 12. Then, the mobility management section 13 generates a predetermined BU packet (BU packet containing information which instructs the MAP to execute packet transmission processing based on a correspondence between the RCoA 1 and the LCoA 3 which have been acquired) and sends the BU packet to the interface 16.

This BU packet contains a destination address (IP address of the MAP (1)) or the like. The interface 16 sends the BU packet to the MAP (1) 20a through the AR (3) 50c connected to the MN 10 (S140).

The BU packet is sent to the mobility management section 23 of the MAP (1) 20a. The mobility management section 23 acquires the RCoA 1 contained in the BU packet. When the acquired RCoA 1 is contained in the binding table, the mobility management section 23 recognizes that the BU packet corresponding to the RCoA 1 has been transmitted in the fixed period of time. Then, the mobility management section 23 rewrites the information recorded on the binding table as follows. That is, the mobility management section 23 rewrites the binding information indicating the correspondence between the RCoA 1 and the LCoA 2 with binding information indicating a correspondence between the RCoA 1 and the LCoA 3. Subsequently, the mobility management section 23 determines whether the BU packet corresponding to the RCoA 1 has been received in the fixed period of time again.

Figure 13:
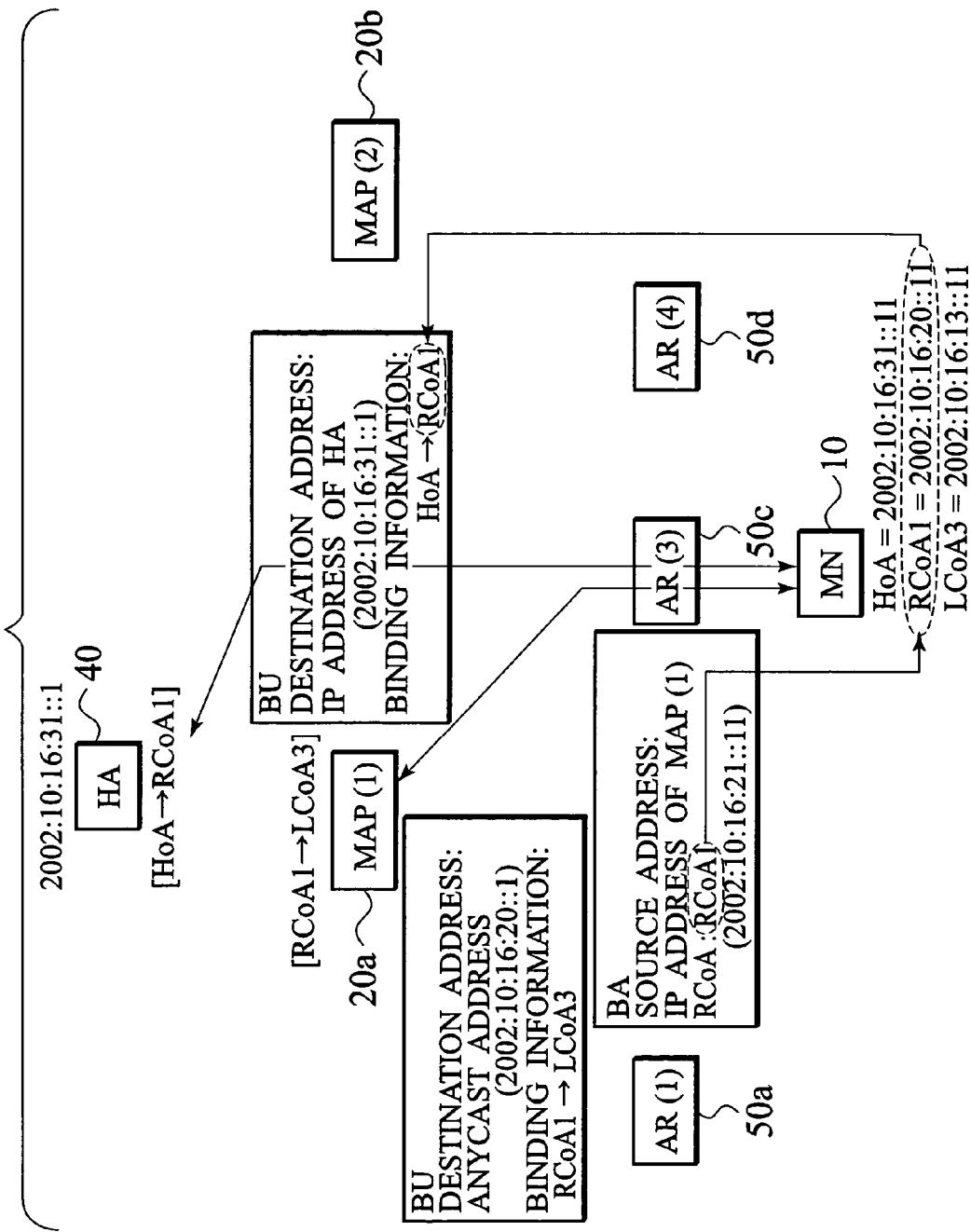
FIG. 13 is a conceptual diagram for explaining a communication method of the Embodiment 1.

FIG. 13 is a conceptual diagram for explaining processing of periodically transmitting a BU packet to the MAP (1) 20*a* and the HA 40 and processing of transmitting a BA packet from the MAP (1) 20*a* and the HA 40 to the MN 10 when the MN 10 is connected to the AR (3) 50*c*. The transmission processing in this case is equivalent to a case in which the "AR (2) 50*b*" is replaced with the "AR (3) 50*c*" and the "LCoA 2" is replaced with the "LCoA 3" in the transmission processing described with reference to FIG. 11.

Figure 14:
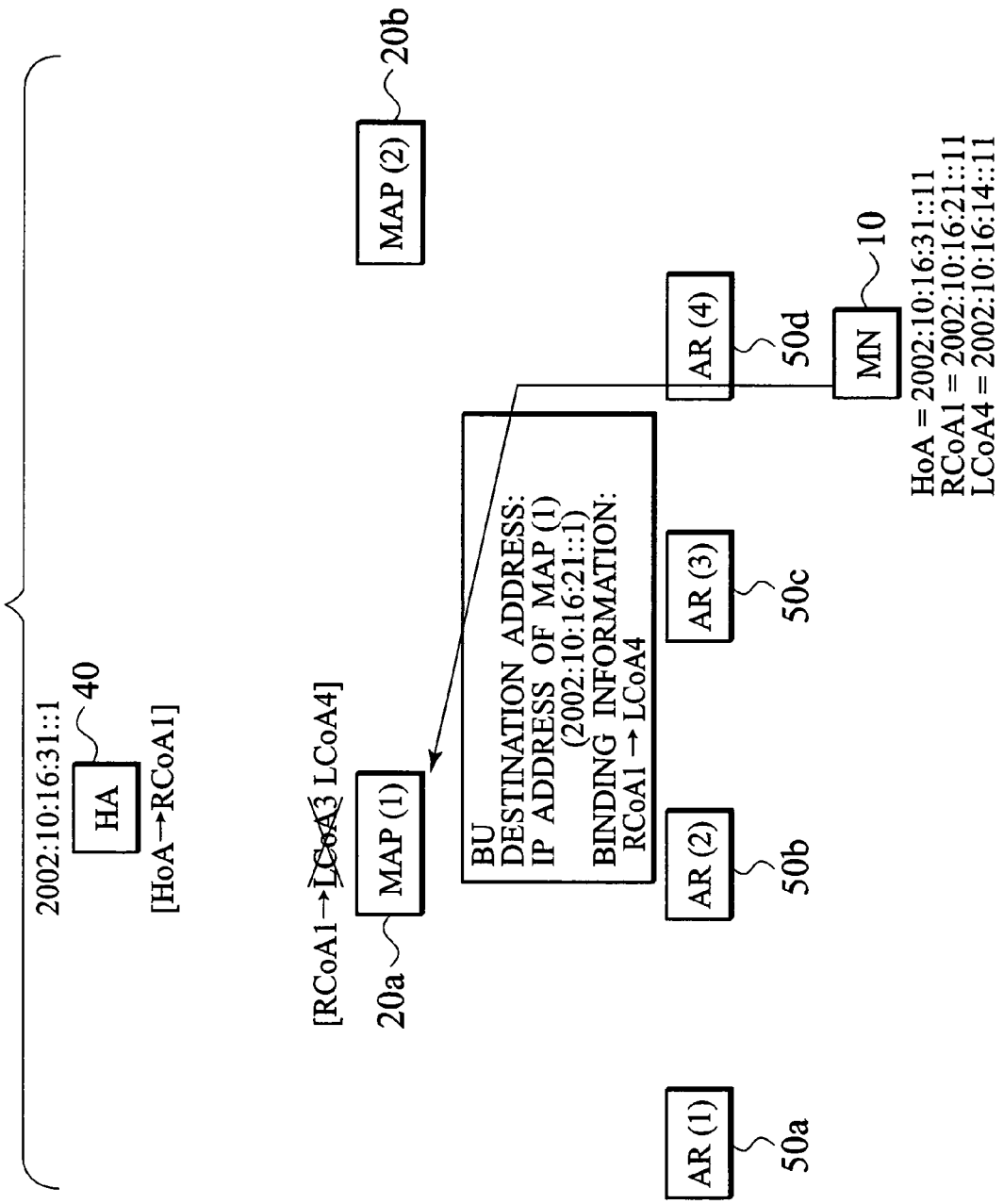
FIG. 14 is a conceptual diagram for explaining a communication method of the Embodiment 1.

FIG. 14 is a conceptual diagram for explaining transmission processing executed immediately after the MN 10 is moved to switch a connection opponent from the AR (3) 50*c* to the AR (4) 50*d*. The transmission processing in this case is equivalent to a case in which the "AR (3) 50*c*" is replaced with the "AR (4) 50*d*," the "LCoA 2" is replaced with the "LCoA 3," and the "LCoA 3" is replaced with the "LCoA 4" in the transmission processing described with reference to FIG. 12.

According to the embodiment, however, the BU packet corresponding to the RCoA 1 is not transmitted again when it is transmitted once. Thereafter, the interface 27 of the MAP (1) 20*a* executes no packet transmission processing based on binding between the RCoA 1 and the LCoA 4.

Figure 15:
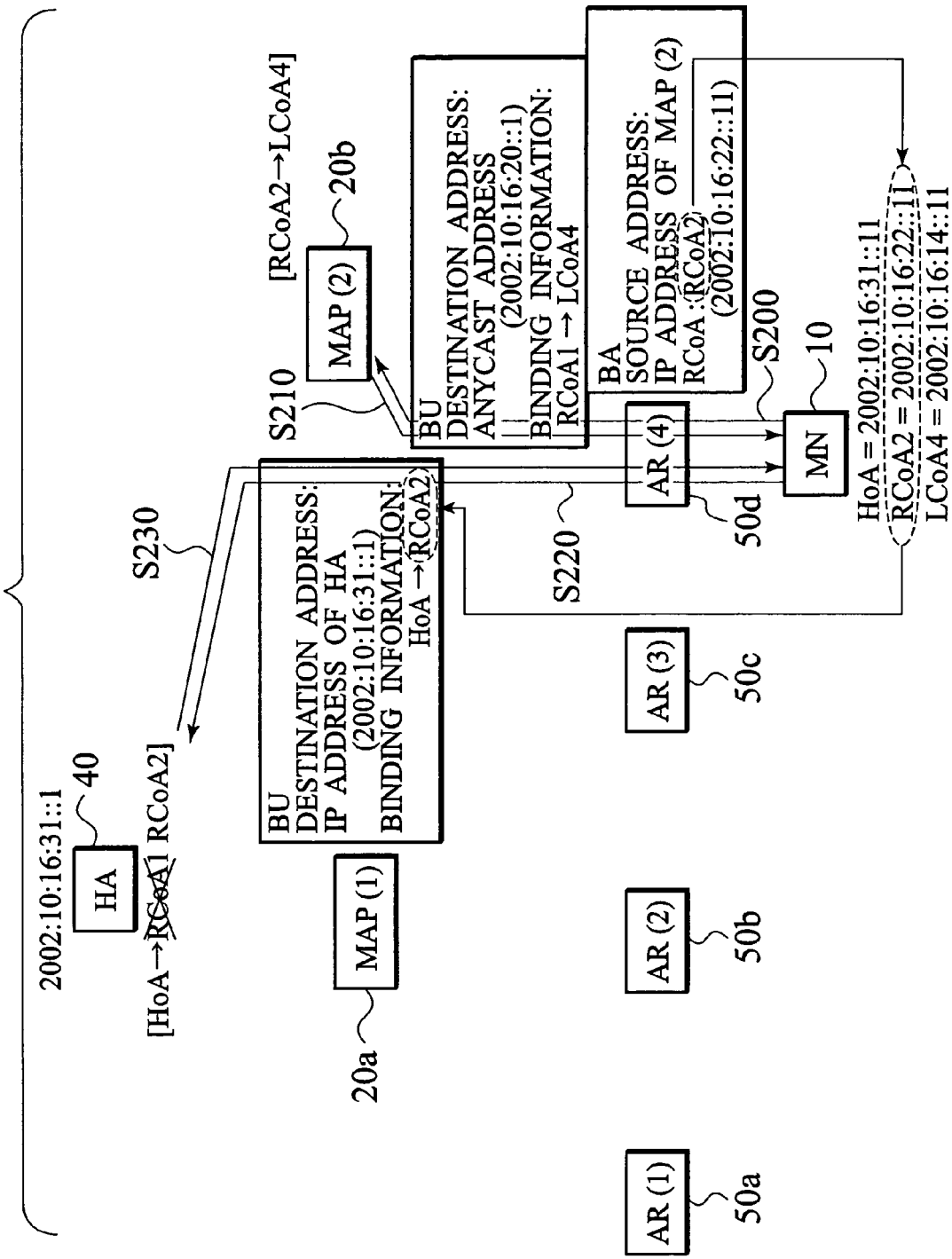
FIG. 15 is a conceptual diagram for explaining the communication method of the Embodiment 1.

FIG. 15 is a conceptual diagram for explaining processing of transmitting a BU packet to the MAP (2) 20*b* and the HA 40 for the first time and processing of transmitting a BA packet from the MAP (2) 20*b* and the HA 40 to the MN 10 when the MN 10 is connected to the AR (4) 50*d*.

The mobility management section 13 of the MN 10 generates a predetermined BU packet. This predetermined BU packet contains information which instructs the MAP to execute packet transmission processing based on a correspondence between the RCoA 1 and the LCoA 4. In addition, the BU packet contains the anycast address regarding the plurality of MAPs as destination address. Then, the mobility management section 13 sends the BU packet to the interface 16. The interface 16 sends the BU packet to the AR (4) 50*d*. Then, the BU packet sent from the AR (4) 50*d* is transmitted to the MAP (2) 20*d* which has the shortest distance to the AR (4) 50*d* through one or a plurality of routers based on the anycast address (S200).

The BU packet is sent to the mobility management section 23 of the MAP (2) 20*b*. The mobility management section 23 acquires the RCoA 1 contained in the BU packet. The mobility management section 23 determines whether the acquired RCoA 1 is contained in the binding table. According to the embodiment, since the RCoA 1 is not contained in the binding table, the mobility management section 23 executes the following processing.

The mobility management section 23 acquires one of the plurality of RCoAs (e.g., RCoA 2 (2002:10:16:22::11), RCoA 3 (2002:10:16:22::22), and RCoA 4 (2002:10:16:22::33) stored in the address information storage section 25. As an example, a case in which the mobility management section 23 acquires the RCoA 2 (2002:10:16:22::11) will be described below.

The mobility management section 23 generates binding information between the acquired RCoA 2 and the LCoA 4 contained in the BU packet. Then, the mobility management section 23 writes the generated binding information on the binding table stored in the binding information storage section 24. Subsequently, the mobility management section 23 determines whether a BU packet corresponding to the RCoA 2 has been received in the fixed period of time again.

Additionally, the mobility management section 23 generates a BA packet which indicates a response to the BU packet. The BA packet contains the RCoA 2 as information to specify the MAP. This RCoA 2 is stored in an RCoA option header in the BA packet. In addition, the BA packet contains a source address (IP address of the MAP (2)) or the like. The interface 27 transmits the BA packet to the MN 10 through the AR (4) 50*d* (S210).

The BA packet is sent to the IP control section 12 of the MN 10. The IP control section 12 sends the RCoA 4 and the IP address of the MAP (2) contained in the BA packet to the management section 14. Here, the RCoA 1 held by the management section 14 and the RCoA 2 sent to the management section 14 are different. Thus, the management section 14 sends information indicating a change in the RCoA to the IP control section 12. The management section 14 holds the received RCoA 2 in place of the RCoA 1 which has been held. Similarly, the management section 14 holds the received IP address of the MAP (2) in place of the IP address of the MAP (1) which has been held.

The IP control section 12 sends a BU packet generation instruction for the HA 40 to the mobility management section 13. The mobility management section 13 generates a predetermined BU packet. This predetermined BU packet contains information which instructs the HA 40 to execute packet transmission processing based on a correspondence between the HoA and the RCoA 2. The BU packet contains the IP address of the HA 40 as a destination address. Additionally, the BU packet contains HoA (home address option header). The mobility management section 13 sends the BU packet to the interface 16. The interface 16 sends the BU packet to the HA 40 (S220).

The BU packet is sent to the mobility management section 43 of the HA 40. The mobility management section 43 determines whether the HoA contained in the BU packet has been recorded on the biding table. According to the embodiment, since the HoA has been recorded on the binding table, the following processing is executed. The mobility management section 43 rewrites the information recorded on the binding table as follows. The mobility management section 43 rewrites the binding information indicating the correspondence between the HoA and the RCoA 1 with binding information indicating a correspondence between the HoA and the RCoA 2. Subsequently, the mobility management section 43 determines whether a BU packet corresponding to the HoA has been received in the fixed period of time.

Then, the mobility management section 43 generates a BA packet which is a response to the BU packet. The BA packet contains a source address (IP address of the HA 40) or the like. The interface 46 transmits the BA packet to the MN 10 through the MAP (2) 20*b* and the AR (4) 50*d* (S230).

Figure 16:
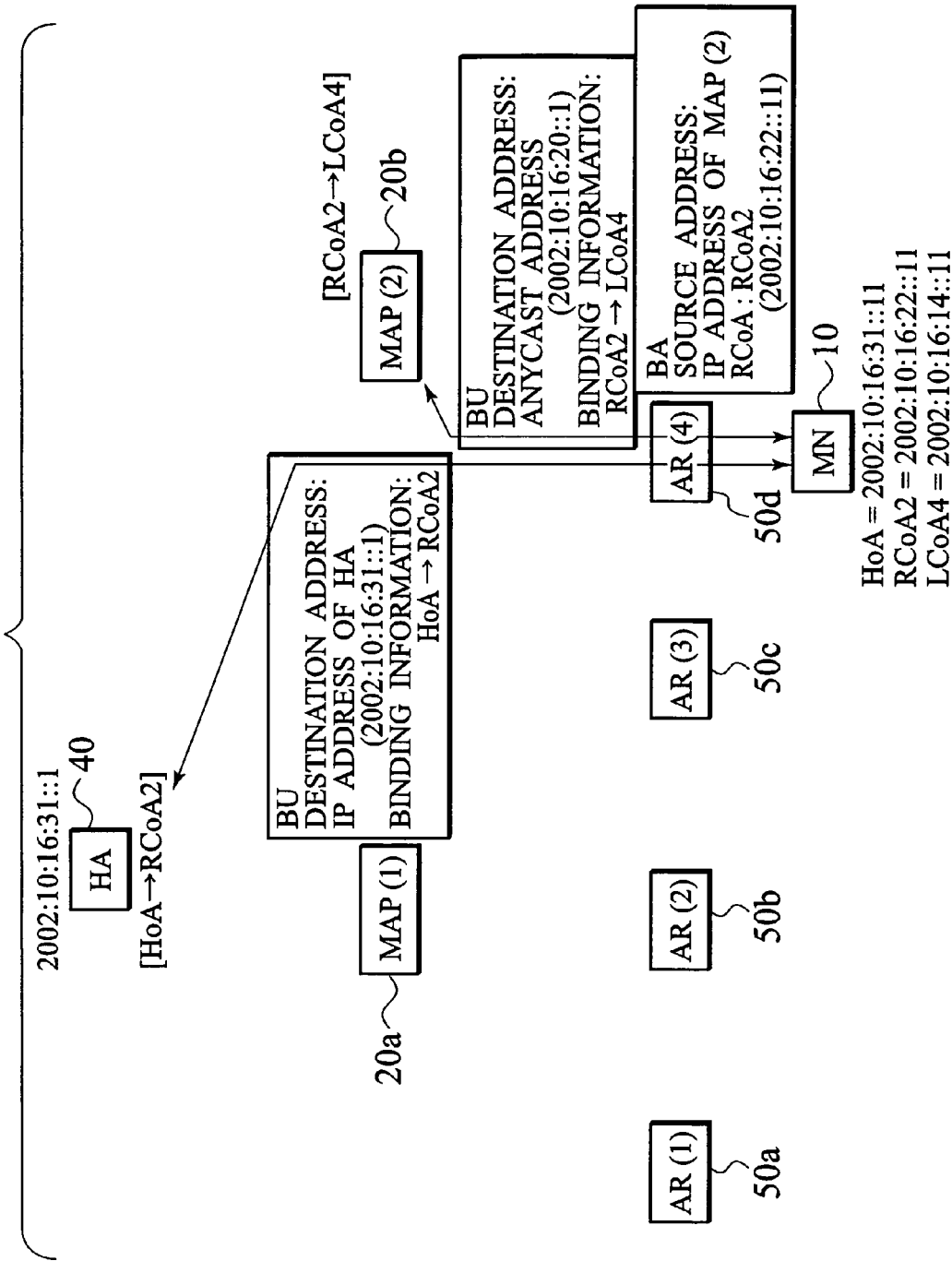
FIG. 16 is a conceptual diagram for explaining a communication method of the Embodiment 1.

FIG. 16 is a conceptual diagram for explaining processing of periodically transmitting a BU packet to the MAP (2) 20*b* and the HA 40 and processing of transmitting a BA packet from the MAP (2) 20*b* and the HA 40 to the MN 10 when the MN 10 is connected to the AR (4) 50*d*. These transmission processings are equivalent to a case in which the AR (2) 50*b* is replaced with the AR (4) 50*d*, the LCoA 2 is replaced with the LCoA 4, the RCoA 1 is replaced with the RCoA 2, and the MAP (1) 20*a* is replaced with the MAP (2) 20*b* in the transmission processing described with reference to FIG. 11.

(Operation Effects)

According to the embodiment, the following operation effects are acquired. The interface 16 of the MN 10 transmits the request for information which specifies the MAP to be used for packet reception, and the anycast address which indicates the address regarding the plurality of MAPs, to the AR connected to the MN 10. Specifically, the interface 16 transmits the BU packet containing the instruction information which instructs the MAP to execute packet transmission processing based on the on-link care of address (LCoA) of the MN 10, and the anycast address which indicates the address regarding the plurality of MAPs 20a to 20d to the AR connected to the MN 10.

One or a plurality of routers transmit the BU packet (aforementioned request) to a MAP which has the shortest distance from the AR on the network among the plurality of MAPs 20a to 20d, based on the anycast address relayed to be transmitted through the AR.

The interface 27 of the MAP (MAP which has the shortest distance from the AR) transmits the information which specifies the MAP to the MN 10 based on the BU packet (aforementioned request). Specifically, based on the BU packet (aforementioned instruction information), the interface 27 executes packet transmission processing based on the LCoA of the MN 10, and transmits the BA packet containing the information which specifies the MAP (e.g., RCoA) to the MN 10.

The IP control section 12 of the MN 10 acquires the information which specifies the MAP and has been transmitted from the interface 27 as information which specifies the MAP to be used for packet reception.

Here, when the MN 10 transmits the BU packet to the MAP, the BA packet containing the information which specifies the MAP, is transmitted from the MAP to the MN 10. Accordingly, the instruction information (BU packet) has a role to request the information which specifies the MAP (MAP to be used by the MN 10 for packet reception).

Thus, according to the embodiment, in each of all the ARs, no information regarding the MAP which has the shortest distance from the AR is set, and the MN 10 can acquire information regarding the MAP which has the shortest distance to the AR connected to the MN 10. Moreover, when new MAP and/or new AR is installed in the communication network, it is not necessary to execute processing for setting information (e.g., address) regarding the MAP which has a shortest distance to the AR. As a result, according to the embodiment, it is possible to reduce a load for maintaining the communication system (communication network), and to reduce management costs for maintaining the communication system.

According to the embodiment, the MN 10 transmits only the BU packet (instruction information) which has the role of making the request without separately transmitting the request of information which specifies the MAP to be used for packet reception and the BU packet (instruction information).

Thus, according to the embodiment, the amount of traffic necessary for the MN 10 to acquire the information to specify the MAP is reduced compared with the case of transmitting the request and the BU packet separately. Accordingly, consumption of resources of the communication system (capacity of the communication system) by the MN 10 to acquire the information which specifies the MAP is limited to a minimum.

When the request and the BU packet are separately transmitted, the following processing is executed. The MN 10 executes the following processing after the MN 10 transmits the request to acquire the information which specifies the MAP (e.g., RCoA). That is, the MN 10 sends the BU packet (e.g., BU packet containing the information which instructs execution of packet transmission processing based on the binding information indicating the correspondence between the RCoA and the LCoA) to the MAP. The MAP executes packet transmission processing based on the BU packet.

On the other hand, according to the embodiment, the following processing is executed when the MN 10 transmits the BU packet (instruction information to which the anycast address regarding the MAP has been added). That is, the BU packet is transmitted to the MAP which has the shortest distance to the AR connected to the MN 10 based on the anycast address. The MAP executes packet transmission processing based on the BU packet, and transmits information which specifies the MAP to the MN 10.

Thus, since new binding information is registered in the MAP (MAP which has the shortest distance to the AR connected to the MN 10), the amount of processing to be executed by the MN 10 is reduced. Moreover, the new binding information is quickly registered in the MAP.

Moreover, when the MAP which has the shortest distance to the AR becomes unusable due to a failure or the like, the MN 10 executes the following processing by containing the anycast address regarding the MAP in the BU packet. That is, the BU packet is transmitted to the MAP which has the shortest distance to the AR (but this MAP must be usable). As a result, it is possible to increase fault tolerance in the communication system of the embodiment.

Further, according to the embodiment, the management section 14 of the MN 10 manages the on-link care of address (LCoA) which indicates the location of the current location of the MN 10. If the LCoA managed by the management section 14 is changed, the interface 16 (first transmission section) of the MN 10 transmits the request for information which specifies the MAP to be used for packet reception and the anycast address which indicates the address regarding the plurality of MAPs to the AR connected to the MN 10. For example, the interface 16 of the MN 10 transmits the BU packet containing the anycast address to the AR connected to the MN 10.

The change of the LCoA managed by the management section 14 means that the MN 10 is moved to switch its connection opponent AR to another. In this case, a possibility of switching of the MAP which has the shortest distance to the AR is high due to the switching of the AR.

According to the embodiment, when the LCoA managed by the management section 14 is changed, the interface 16 of the MN 10 transmits the BU packet (request for information which specifies the MAP to be used for packet reception). When the MN 10 transmits the BU packet by the aforementioned timing, the MN 10 can recognize the change of the MAP which has the shortest distance to the AR connected to the MN 10 more efficiently compared with the case of transmitting the BU packet by other timing.

Additionally, according to the embodiment, the address information storage section 25 is disposed in each of the MAPs 20a to 20d. The address information storage section 25 stores one or a plurality of addresses in care of a network (RCoA) not associated with the MN 10. Each of the addresses in care of the network (RCoA) contains information to specify a network in which the MAP is present. The interface 27 of the MAP transmits any selected from the one or the plurality of RCoAs stored in the address information storage section 25 as information which specifies the MAP.

The interface 16 of the MN 10 receives the RCoA containing the information to specify the network in which the MAP is present as information which specifies the MAP. The management section 14 of the MN 10 manages the RCoA received by the interface 16 as information which specifies the MAP currently used for packet reception.

Thus, since the RCoA is transmitted as the information to specify the MAP to the MN 10, it is not necessary for the MN 10 to generate any RCoA. Accordingly, processing load on the MN 10 is reduced compared with the conventional case.

Further, each MAP (transfer device) finishes the packet transmission processing when no information which instructs the MAP to execute the packet transmission processing based on the LCoA (on-link care of address) is acquired for a fixed period of time. Specifically, the interface 27 of each MAP finishes the packet transmission processing when no BU packet (BU packet containing information which instructs the MAP to execute packet transmission processing) is acquired based on the LCoA for the fixed period of time.

The management section 14 of the MN 10 manages the information which specifies the MAP currently used for packet reception. When the LCoA (on-link care of address) managed by the management section 14 is changed, the interface 16 of the MN 10 transmits the BU packet (BU packet containing information which instructs execution of packet transmission processing based on the changed LCoA) to the MAP based on the information (IP address of the MAP) which specifies the MAP and is currently managed by the management section 14 (unicast transmission).

After the execution of the unicast transmission, the interface 16 of the MN 10 transmits the BU packet to the AR connected to the MN 10 for each interval shorter than the fixed period of time. This BU packet contains the instruction information which instructs the MAP to execute packet transmission processing based on the LCoA of the MN 10, and the anycast address which indicates the address regarding the plurality of MAP's 20a to 20d.

According to the control system of the HMIP, the MN 10 can request buffering of a packet transmitted to the MN 10 to the MAP during hands-off. The MN 10 can also request the AR to which the MN 10 has been connected and the AR to which the MN 10 is to be newly connected, to duplicate and transfer the packet. The MN 10 can contain, e.g., these requests, a message regarding a stop of the buffering processing and/or a message regarding a stop of the duplicating and transferring processing in the BU packet. However, the BU packet which contains the message of the processing regarding hands-off is not for extending the period of the binding information. Thus, when the LCoA (on-link care of address) managed by the management section 14 is changed, preferably, the BU packet is transmitted to the MAP currently used by the MN 10 for packet reception.

Then, when the MAP which has the shortest distance to the AR connected to the MN 10 is changed immediately after the hands-off, the packet addressed to the MN 10 may be transmitted to the original MAP before the BU packet (instruction information) is transmitted to new MAP. In such a case, a loss of the packet addressed to the MN 10 (packet loss) may occur.

Thus, the BU packet (instruction information) is transmitted to the MAP (original MAP) based on the information (IP address of the MAP) which specifies the MAP (original MAP) currently managed by the management section 14 (unicast transmission). As a result, the MAP continues the transmission processing of the packet addressed to the MN 10. Accordingly, the loss of the packet addressed to the MN 10 immediately after the hands-off is reduced.

After the execution of the unicast transmission, the interface 16 of the MN 10 transmits the BU packet containing the anycast address to the AR connected to the MN 10 for each interval shorter than the fixed period of time. Thus, for example, the BU packet is transmitted to the MAP (new MAP) which has the shortest distance to the AR connected to the MN after hands-off. As a result, after hands-off, the MAP (new MAP) which has the shortest distance to the AR connected to the MN can execute transmission processing of the packet addressed to the MN 10.

Moreover, the BU packet is not transmitted to the MAP (original MAP) which has the shortest distance to the AR connected to the MN before hands-off. Thus, in the MAP (original MAP) which has the shortest distance to the AR connected to the MN 10 before hands-off, the transmission processing of the packet addressed to the MN 10 is stopped. As a result, execution of useless processing is prevented in the original MAP.

Further, according to the embodiment, the interface 27 of the MAP transmits the packet, transmitted from the CN 30 (communication opponent device) and addressed to the MN 10, to the AR based on the correspondence between the LCoA (on-link care of address) which indicates the location of the current location of the mobile terminal and the RCoA (regional care-of address) containing the information to specify the network in which the MAP is present.

Furthermore, when the MN 10 transmits the instruction information (information which instructs the MAP to execute packet transmission processing based on the correspondence between the LCoA (on-link care of address) of the MN 10 and the predetermined RCoA (regional care-of address), and the anycast address which indicates the address regarding the plurality of MAPs to the AR connected to the MN 10, the interface 27 of the MAP receives the transmitted instruction information based on the anycast address.

According to the embodiment, when the MN 10 transmits the BU packet, the BU packet is transmitted to the MAP which has the shortest distance to the AR connected to the MN 10 based on the anycast address. When the predetermined RCoA contained in the BU packet transmitted from the MN 10 contains no information (network prefix) to specify the network in which the MAP is present, the mobility management section 23 of the MAP executes the following processing.

The mobility management section 23 of the MAP generates a correspondence (binding information) between any selected from among the one or the plurality of RCoAs (RCoA containing the network prefix but not associated with the MN 10) and the LCoA contained in the BU packet.

The interface 27 of the MAP executes packet transmission processing based on the correspondence (binding information) generated by the mobility management section 23. Moreover, the interface 27 transmits the selected RCoA (RCoA contained in the generated binding information) to the MN 10. Specifically, the interface 27 transmits the BA packet containing the RCoA to the MN 10. The IP control section 12 of the MN 10 acquires the RCoA as information which specifies the MAP to be used for packet reception.

According to the embodiment, the following effects are acquired compared with a predetermined case (i.e., the case in which the MN 10 transmits the request for information which specifies the MAP to be used for packet reception to the MAP, the MN 10 acquires the information which specifies the MAP, the MN 10 transmits the BU packet containing the information which specifies the MAP to the MAP, and the MAP executes transmission processing of the packet addressed to the MN 10 based on the BU packet).

The following processing is executed only by transmitting the BU packet containing the anycast address of the MAP from the MN 10. That is, the MAP can execute transmission processing of the packet addressed to the MN 10 based on the BU packet. Moreover, the information which specifies the MAP to be used for packet reception is sent to the MN 10. Thus, since new binding information is registered in the MAP which has the shortest distance to the AR connected to the MN 10, the MN 10 needs not execute transmission processing of the request for information to specify the MAP and transmission processing of the BU packet separately but only needs to transmit the BU packet containing the anycast address of the MAP. Accordingly, the amount of processing, which the MN 10 has to execute so that the new binding information is registered in the MAP which has the shortest distance to the AR connected to the MN 10, is reduced. Moreover, the new binding information is quickly registered in the MAP which has the shortest distance to the AR connected to the MN 10.

Note that, according to the embodiment, the MN 10 can always receive a packet addressed thereto from the CN 30 through the MAP which has the shortest distance to the AR connected to the MN 10.

EMBODIMENT 2

According to the embodiment, functions of the MN 10, the MAPs 20a to 20d and the HA 40 are different from those of the Embodiment 1. Moreover, according to the embodiment, no RCoA is used. In this embodiment, an IP address of MAP is used in place of RCoA. Information which specifies MAP is an IP address allocated to the MAP.

That is, in the present embodiment, "IP address of MAP" is used as "information which specifies MAP" in the description of the configuration of the respective sections (MN 10, MAP, HA 40) of the Embodiment 1, and "RCoA" and "RCoA and IP address of MAP" are replaced by "IP address of MAP". No address information storage section 25 is disposed in the MAP of the embodiment. According to the embodiment, other points different from the Embodiment 1 are as follows.

(MN 10)

The management section 14 of the MN 10 manages an address of a transfer device (MAP) currently used for packet reception. The interface 16 of the MN 10 executes the following processing when a received first MAP address (e.g., IP address) is different from a second MAP address (e.g., IP address) currently managed by the management section 14. The interface 16 transmits to the HA 40 information which instructs execution of packet transmission processing based on the first MAP address. Details of the processing are as follows.

The mobility management section 13 generates a BU packet. This BU packet contains information which instructs the MAP to execute packet transmission processing based on a correspondence between HoA and LCoA. A specific generation process of the BU packet by the mobility management section 13 is as follows.

The mobility management section 13 sets the LCoA acquired as a source address, and sets anycast address regarding the plurality of MAPs as a destination address, and sets HoA as a home address option header. Subsequently, the mobility management section 13 generates the BU packet. This BU packet contains information which instructs the MAP to execute packet transmission based on a correspondence between the source address (i.e., LCoA) and an address (i.e., HoA) stored in the home address option header.

The interface 16 of the MN 10 transmits the BU packet to the AR connected to the MN 10. The BU packet contains instruction information (information which instructs the MAP to execute packet transmission processing based on a correspondence between LCoA (on-link care of address) of the MN 10) and HoA and anycast address which indicates address regarding the plurality of MAP's.

Additionally, the mobility management section 13 generates a BU packet (BU packet containing information which instructs the HA 40 to execute packet transmission processing based on the correspondence between the IP address of the MAP and the HoA). Details of processing of the BU packet by the mobility management section 13 are as follows.

The mobility management section 13 sets the IP address of the HA 40 as a destination address, the HoA as a home address option header, and the IP address of the MAP as an option header for storing the IP address of the MAP. The mobility management section 13 generates the BU packet by adding the set information (HoA or the like) to predetermined instruction information (information which instructs the HA 40 to execute packet transmission processing based on the correspondence between the IP address of the MAP and the address (i.e., HoA) stored in the home address option header).

The interface 16 transmits the BU packet (BU packet containing information which instructs the HA 40 to execute packet transmission processing based on the IP address of the MAP) to the HA 40 through the AR.

(MAP)

The interface 27 of the MAP transmits a packet, transmitted from the CN 30 and addressed to the MN 10, to the AR based on a correspondence between the LCoA and the HoA. The binding information storage section 24 stores a binding table which indicates a correspondence between each HoA and each LCoA.

The HA 40 transmits the packet, transmitted from the CN 30 and addressed to the MN 10, to the MAP. The packet contains data (e.g., payload data), and HoA and the IP address of the MAP. The packet is sent to the IP control section 22 through the interface 27. The IP control section 22 removes the IP address of the MAP from the packet upon recognition that the IP address of the MAP contained in the packet is an IP address of its own device (decapsulation processing). The IP control section 22 sends the packet to the mobility management section 23.

The mobility management section 23 acquires LCoA corresponding to the HoA recorded on the binding table. The mobility management section 23 encapsulates the packet by a header which contains the acquired LCoA. The mobility management section 23 sends the packet to the interface 27 through the IP control section 22.

The mobility management section 23 acquires the HoA contained in the received BU packet. When the acquired HoA is contained in the binding table, the mobility management section 23 recognizes for a fixed period of time (first fixed period of time) that a BU packet corresponding to the HoA has been transmitted. When binding information (correspondence between the HoA and the LCoA) corresponding to the HoA has been recorded on the binding table, the mobility management section 23 records information indicating continuance of the correspondence between the acquired HoA and the LCoA on the binding table. Then, the mobility management section 23 determines whether a BU packet corresponding to the HoA has been transmitted or not for the fixed period of time again. Accordingly, the interface 27 continues the packet transmission processing based on the correspondence between the HoA and the LCoA.

On the other hand, when no binding information corresponding to the HoA has been recorded on the binding table, the mobility management section 23 records the correspondence between the acquired HoA and the LCoA on the binding table. Then, the mobility management section 23 determines whether a BU packet corresponding to the HoA has been transmitted or not for the fixed period of time.

The interface 27 transmits the information which specifies the MAP (IP address of the MAP) to the MN 10 based on the BU packet. In this event, the mobility management section 23 acquires the source address (LCoA of the MN 10) and the IP address of the MAP contained in the BU packet.

The mobility management section 23 generates a BA (binding update response) packet which indicates a response to the BU packet. Details of generation processing thereof are as follows. The mobility management section 23 sets the IP address of the MAP as a source address, and the LCoA of the MN 10 as a destination address. The mobility management section 23 generates a BA packet by adding each set information (IP address of the MAP or the like) to information indicating completion of binding.

(HA)

The HA 40 transmits the packet transmitted from the CN 30, which transmits the packet to the MN 10, to the MAP based on the address thereof.

The interface 46 transmits the packet transmitted from the CN 30 to the MAP based on the correspondence between the HoA and the IP address of the MAP. The binding information storage section 44 stores a binding table which indicates a correspondence between each HoA and an IP address of each MAP. When the packet addressed to the MN 10 is sent from the CN 30, the mobility management section 43 refers to the binding table to acquire the IP address of the MAP corresponding to the HoA. The mobility management section 43 executes encapsulation processing of the packet by using a header which contains the acquired IP address of the MAP.

Additionally, the interface 46 transmits a BA packet which indicates a response to the BU packet to the MN 10 based on the BU packet. Incidentally, the mobility management section 43 generates the BA packet. Details of generation processing thereof are as follows. The mobility management section 43 sets the IP address of the HA as a source address. The mobility management section 43 generates a BA packet by adding the set IP address of the HA to information indicating the completion of biding.

(Communication Method)

Figure 17:
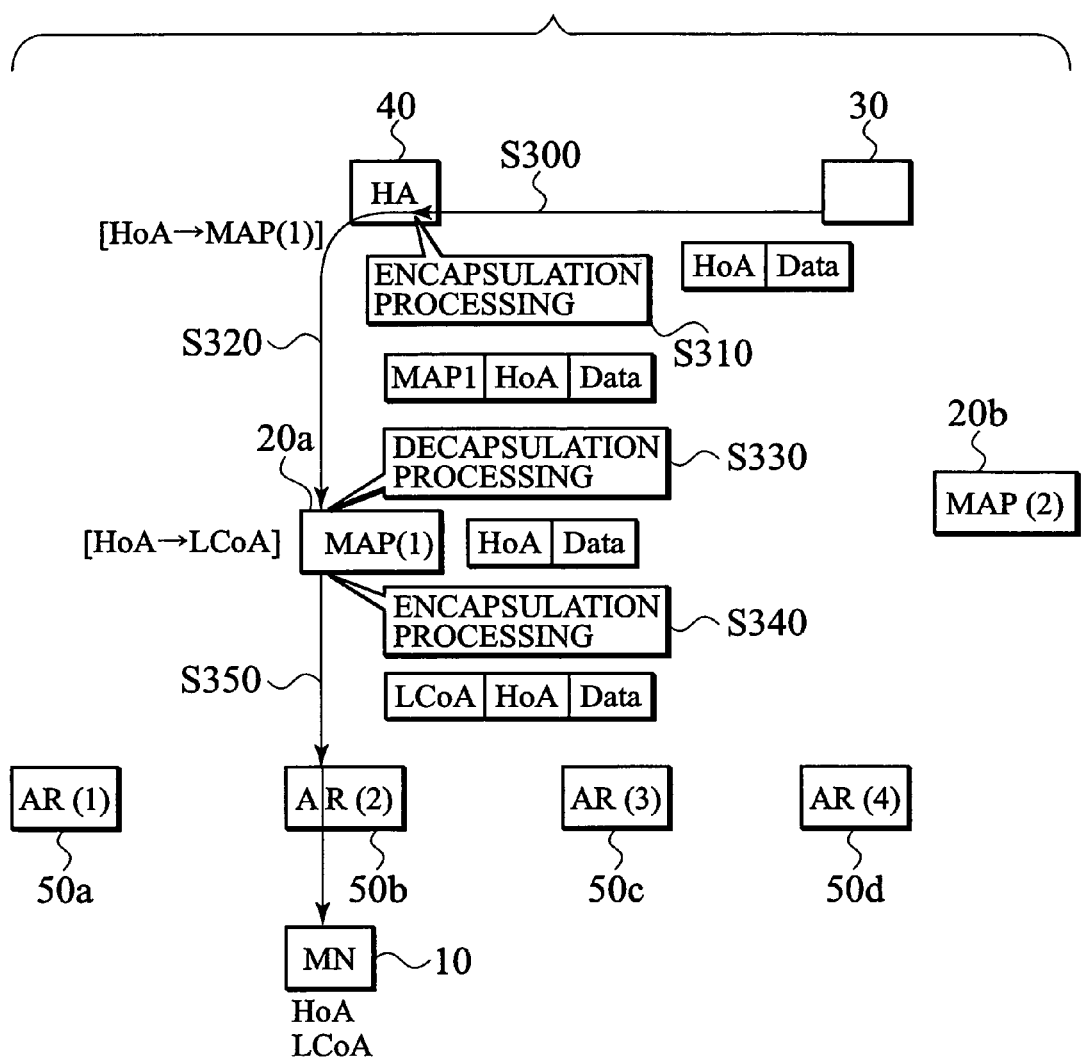
FIG. 17 is a conceptual diagram for explaining a packet transmission method of Embodiment 2.
Figure 18:
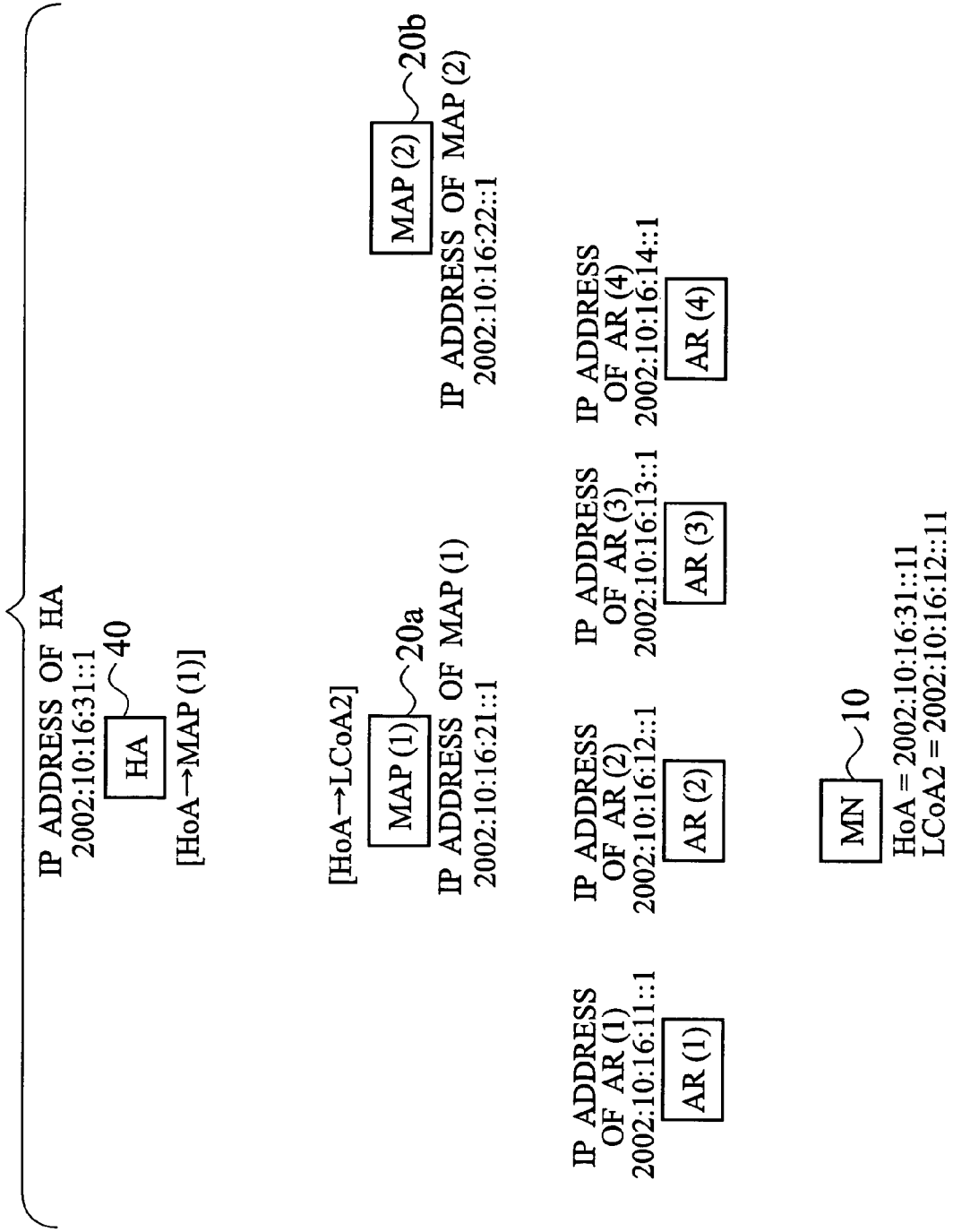
FIG. 18 is a conceptual diagram for explaining a communication method of the Embodiment 2.

FIG. 17 is a conceptual diagram explaining a method of receiving the packet transmitted from the CN 30 by the MN 10 according to the embodiment. The CN 30 transmits a packet, which contains data (e.g., payload data), a destination address (HoA corresponding to the MN 10) added to the data, and a source address (address of the CN 30) added to the data, to the HA 40 (S300).

The IP control section 42 of the HA 40 acquires the packet based on the destination address contained in the packet, and sends the acquired packet to the mobility management section 43. The mobility management section 43 refers to the binding table to acquire an IP address of the MAP (1) corresponding to the HoA. The mobility management section 43 executes encapsulation processing for the packet by using a header which contains the IP address (S310). The interface 46 of the HA 40 transmits the packet to the MAP (1) 20a (S320).

The IP control section 22 of the MAP (1) removes the destination address (IP address of the MAP (1)) contained in the packet (decapsulation processing, S330), and sends the packet from which the destination address has been removed to the mobility management section 23. The mobility management section 23 refers to the binding table to acquire LCoA corresponding to the HoA. The mobility management section 43 executes encapsulation processing for the packet by using a header which contains the LCoA (S340). The interface 27 of the MAP (1) 20a transmits the packet to the MN 10 through the AR (2) 50b (S350).

The IP control section 12 of the MN 10 acquires the HoA and the LCoA contained in the received packet. The IP control section 12 determines coincidence between the acquired HoA and LCoA and the HoA and LCoA held by own device respectively. When the acquired HoA and LCoA coincide with the HoA and LCoA held by own device respectively, the IP control section 12 acquires the packet. Then, the IP control section 12 recognizes that "the packet has been transmitted from the CN 30" based on the source address contained in the packet.

(Transmission Processing of BU Packet and Transmission Processing of BA Packet when MN 10 is Moved)

FIGS. 18 to 24 are conceptual diagrams for explaining transmission processings of a BU packet and a BA packet when the MN 10 is moved according to the embodiment.

In this case, following points are different from the Embodiment 1. The management section 14 of the MN 10 manages LCoA 2 (2002:10:16:12::11) and an IP address of the MAP (1). Binding information indicating a correspondence between the HoA and the IP address of the MAP (1) is recorded on the binding table stored in the binding information storage section 44 of the HA 40. Binding information indicating a correspondence between the HoA and the LCoA 2 is recorded on the binding table stored in the binding information storage section 24 of the MAP (1) 20a.

Figure 19:
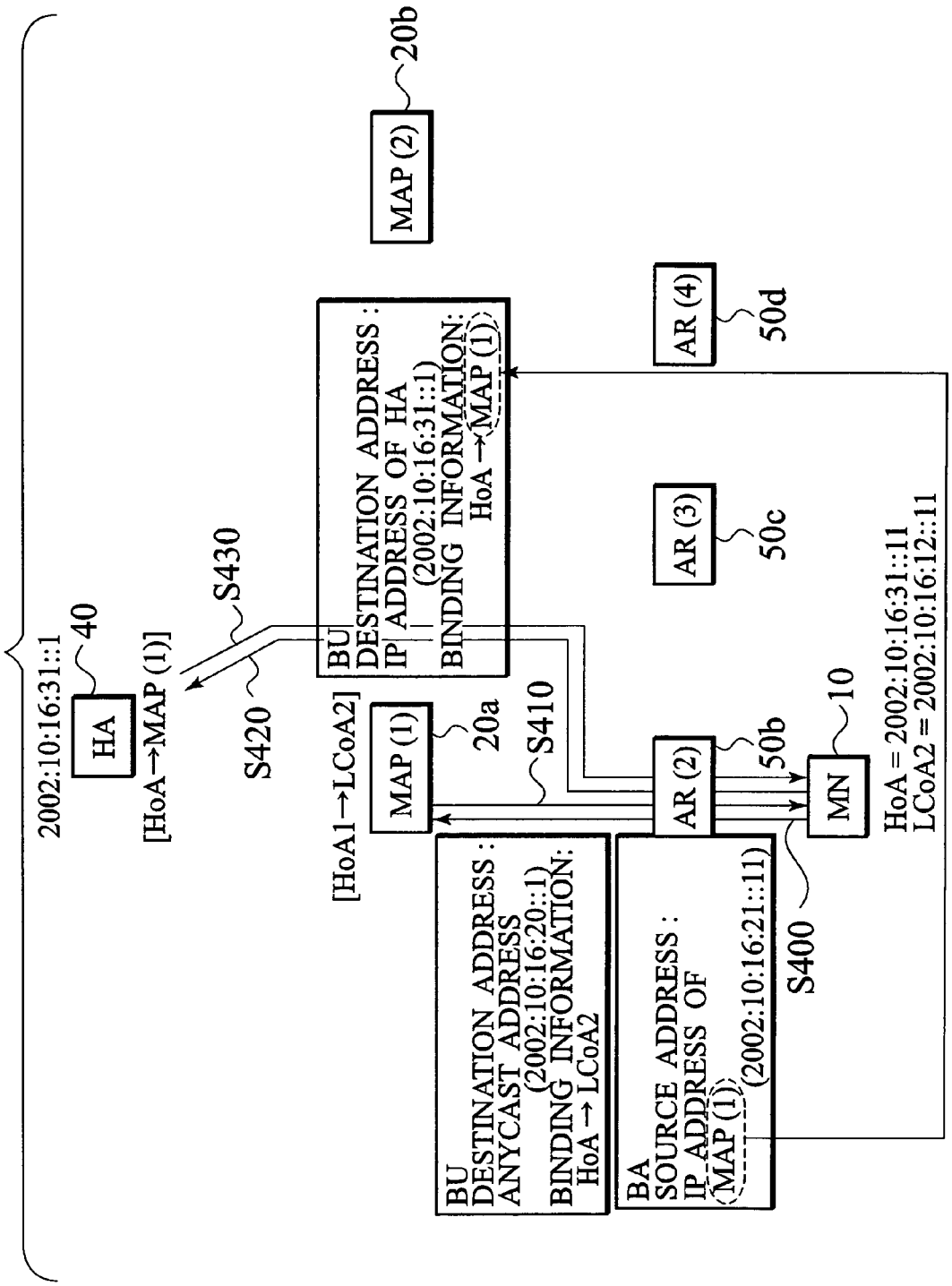
FIG. 19 is a conceptual diagram for explaining a communication method of the Embodiment 2.

FIG. 19 is a conceptual diagram explaining processing of the MN 10 to periodically transmit a BU packet to the MAP (1) 20a and the HA 40 and processing of the MAP (1) 20a and the HA 40 to transmit a BA packet to the MN 10 when the MN 10 is connected to the AR (2) 50b.

The mobility management section 13 of the MN 10 generates a BU packet periodically (at each time interval shorter than the first fixed period of time). This BU packet contains information which instructs the MAP to execute packet transmission processing based on a correspondence between the HoA and the LCoA 2. The BU packet contains anycast address regarding the plurality of MAPs as destination addresses. Incidentally, the HoA of the MN 10 is stored in the home address option of the BU packet. The mobility management section 13 sends the BU packet to the interface 16. The interface 16 sends the BU packet to the AR (2) 50b. The BU packet sent from the AR (2) 50b is transmitted to the MAP (1) 20a, which has the shortest distance to the AR (2) 50b, through one or a plurality of routers based on the anycast address (S400).

The BU packet is sent to the mobility management section 23 of the MAP (1) 20a. The mobility management section 23 acquires the HoA contained in the BU packet. When the acquired HoA is contained in the binding table, the mobility management section 23 recognizes that a BU packet corresponding to the HoA has been transmitted for the fixed period of time. According to the embodiment, since the acquired HoA is contained in the binding table, the mobility management section 23 executes the recognition processing.

The mobility management section 23 records information indicating continuance of the correspondence between the HoA and the LCoA 2 on the binding table. Subsequently, the mobility management section 23 determines whether the BU packet corresponding to the HoA has been received or not for the fixed period of time again.

The mobility management section 23 generates a BA packet which is a response to the BU packet. In this event, the BA packet contains the IP address of the MAP (1) 20a (source address). The interface 27 transmits the BA packet to the MN 10 through the AR (2) 50b (S410).

The BA packet is sent to the IP control section 12 of the MN 10. The IP control section 12 sends the acquired IP address of the MAP (1) to the management section 14. The management section 14 sends information indicating no change of the IP address of the MAP to the IP control section 12. Subsequently, for example, the IP control section 12 may send a BU packet generation instruction for the HA 40 to the mobility management section 13.

The mobility management section 13 generates BU packets periodically (at each time interval shorter than the second fixed period of time). For example, this generation processing may be executed after the mobility management section 13 acquires the BU packet generation instruction for the HA 40 from the IP control section 12. The BU packet contains information which instructs the HA 40 to execute packet transmission processing based on the correspondence between the HoA and the IP address of the MAP (1). Additionally, the BU packet contains the IP address of the HA 40 as a destination address. The mobility management section 13 sends the BU packet to the interface 16. The interface 16 sends the BU packet to the HA 40 (S420).

The BU packet is sent to the mobility management section 43 of the HA 40. When the acquired HoA is contained in the binding table, the mobility management section 43 recognizes that the BU packet corresponding to the HoA has been transmitted for a fixed period of time. According to the embodiment, since the acquired HoA is contained in the binding table, the mobility management section 43 executes the recognition processing.

The mobility management section 43 records information indicating continuance of the correspondence between the acquired HoA and the IP address of the MAP (1) on the binding table. Subsequently, the mobility management section 43 determines whether the BU packet corresponding to the HoA has been received or not for the fixed period of time again.

The mobility management section 43 generates a BA packet which is a response to the BU packet. This BA packet contains a source address (IP address of the HA 40). The interface 46 transmits the BA packet to the MN 10 through the MAP (1) 20*a* and the AR (2) 50*b* (S430).

Figure 20:
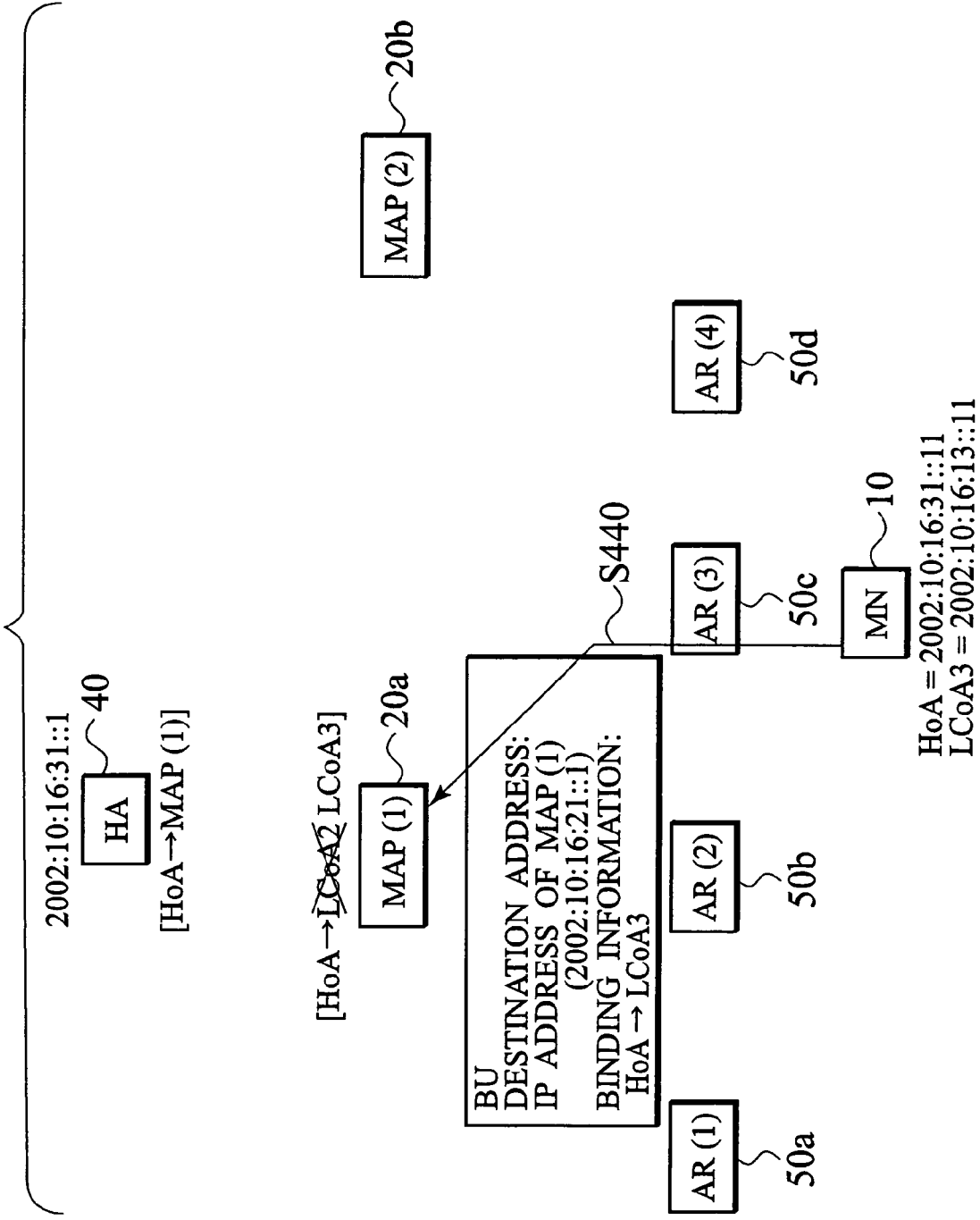
FIG. 20 is a conceptual diagram for explaining a communication method of the Embodiment 2.

FIG. 20 is a conceptual diagram explaining transmission processing executed immediately after the MN 10 is moved to switch a connection opponent from the AR (2) 50*b* to the AR (3) 50*c*.

The management section 14 of the MN 10 manages new LCoA 3, and sends information indicating a change of the LCoA to the mobility management section 13. The mobility management section 13 acquires information managed by the management section 14 (IP address of the MAP (1) and LCoA 3) through the IP control section 12. The mobility management section 13 generates a BU packet (BU packet containing information which instructs the MAP to execute packet transmission processing based on a correspondence between the HoA and the LCoA 3), and sends the BU packet to the interface 16. This BU packet contains a destination address (IP address of the MAP (1)) or the like. The interface 16 sends the BU packet to the MAP (1) 20*a* through the AR (3) 50*c* connected to the MN 10 (S440).

The BU packet is sent to the mobility management section 23 of the MAP (1). The mobility management section 23 acquires the HoA contained in the BU packet. When the acquired HoA is contained in the binding table, the mobility management section 23 recognizes that a BU packet corresponding to the HoA has been transmitted for a fixed period of time. The mobility management section 23 rewrites the information recorded on the binding table as follows. The mobility management section 23 rewrites the binding information indicating the correspondence between the HoA and the LCoA 2 to be binding information indicating a correspondence between the HoA and the LCoA 3. Subsequently, the mobility management section 23 determines whether the BU packet corresponding to the HoA has been received or not for the fixed period of time again.

Figure 21:
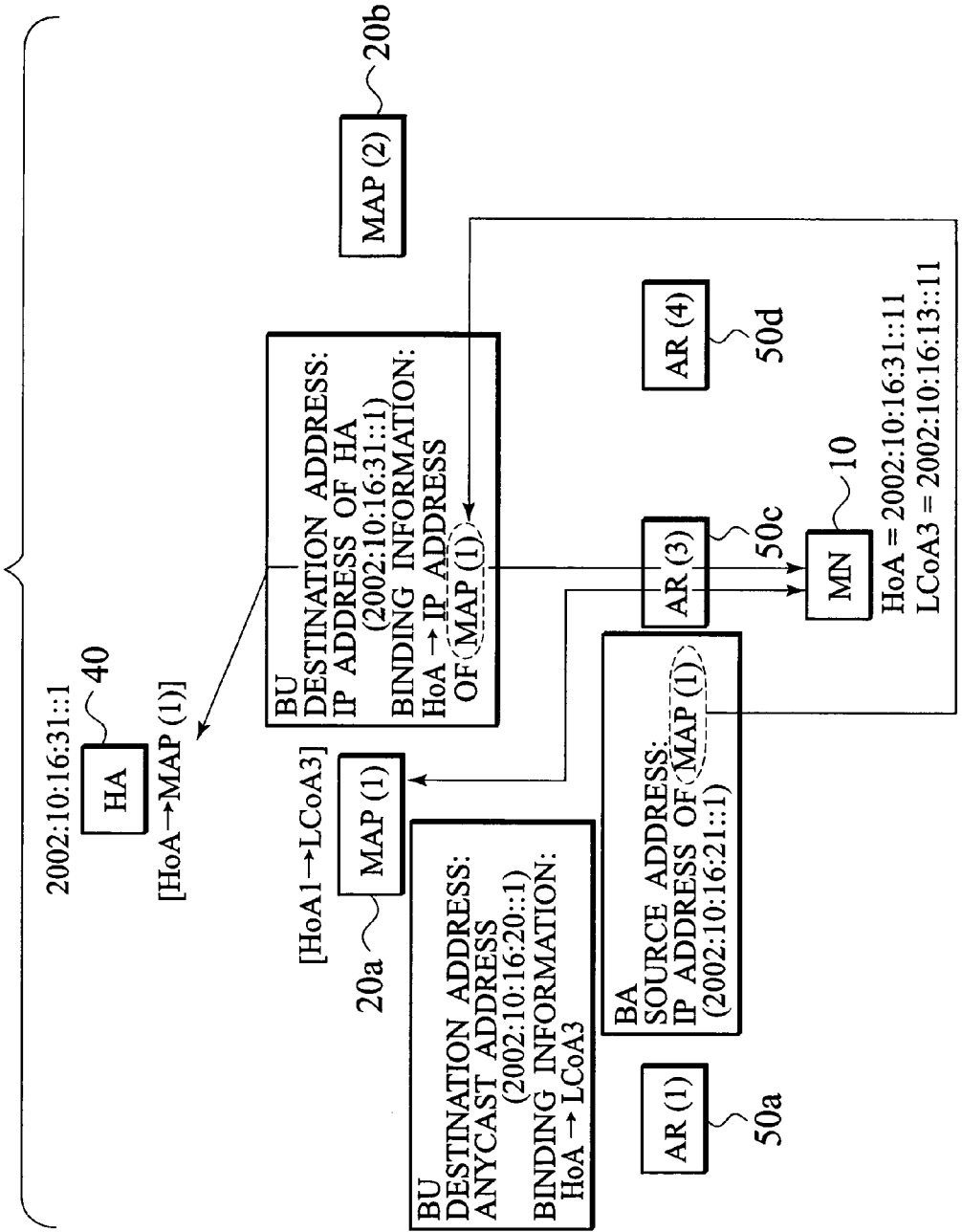
FIG. 21 is a conceptual diagram for explaining a communication method of the Embodiment 2.

FIG. 21 is a conceptual diagram explaining processing of periodically transmitting a BU packet to the MAP (1) 20*a* and the HA 40 and processing of transmitting a BA packet from the MAP (1) 20*a* and the HA 40 to the MN 10 when the MN 10 is connected to the AR (3) 50*c*. The transmission processing in this case is equivalent to a case in which the "AR (2) 50*b*" is replaced by the "AR (3) 50*c*" and the "LCoA 2" is replaced by the "LCoA 3" in the transmission processing described above with reference to FIG. 19.

Figure 22:
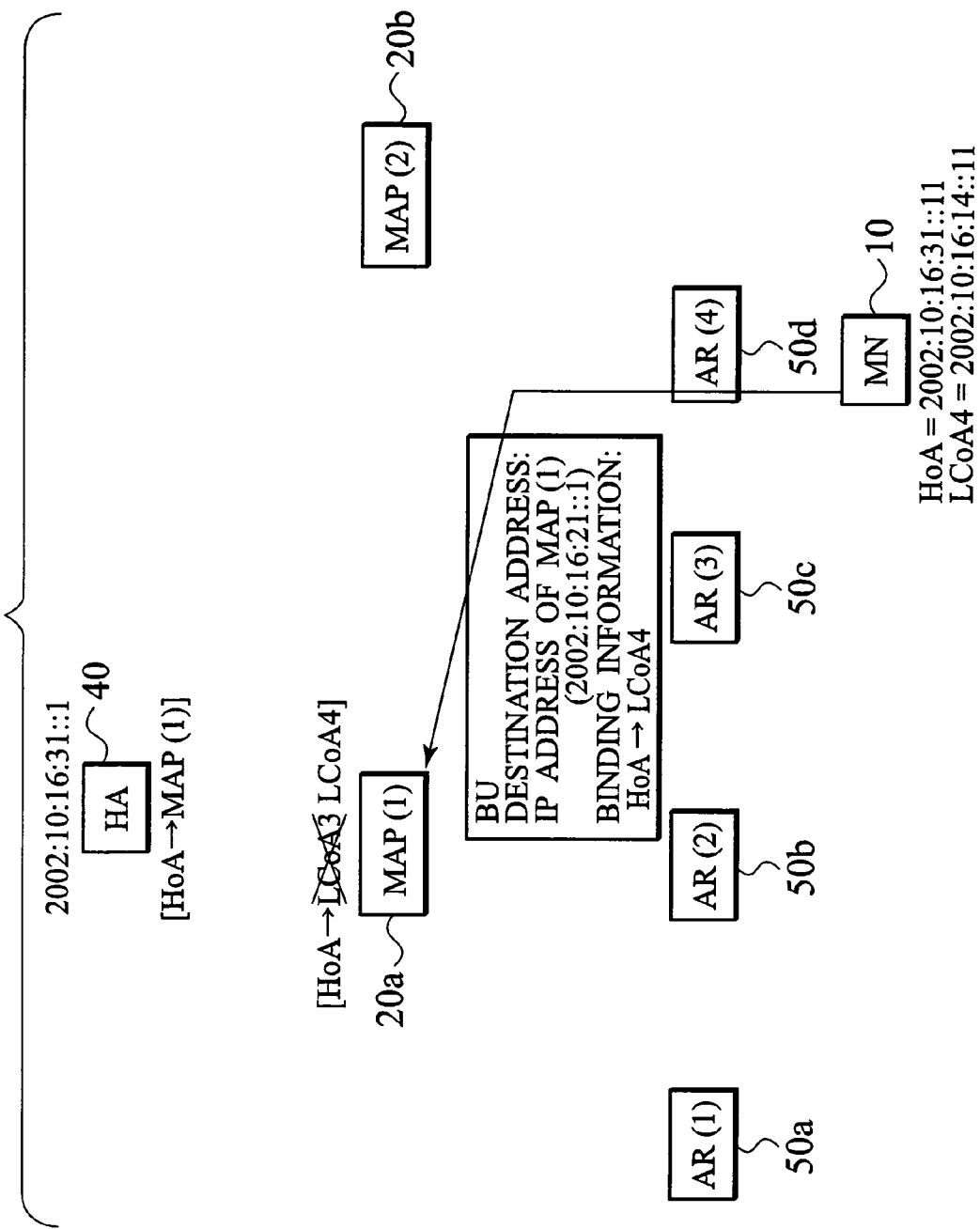
FIG. 22 is a conceptual diagram for explaining a communication method of the Embodiment 2.

FIG. 22 is a conceptual diagram explaining transmission processing executed immediately after the MN 10 is moved to switch a connection opponent from the AR (3) to the AR (4). The transmission processing in this case is equivalent to a case in which the "AR (3)" is replaced by the "AR (4)", the "LCoA 2" is replaced by the "LCoA 3", and the "LCoA 3" is replaced by the "LCoA 4" in the transmission processing described above with reference to FIG. 20.

According to the embodiment, however, the BU packet corresponding to the HoA is not transmitted again if it has been transmitted once. Thereafter, the interface 27 of the MAP (1) 20*a* executes no packet transmission processing based on binding between the HoA and the LCoA 4.

Figure 23:
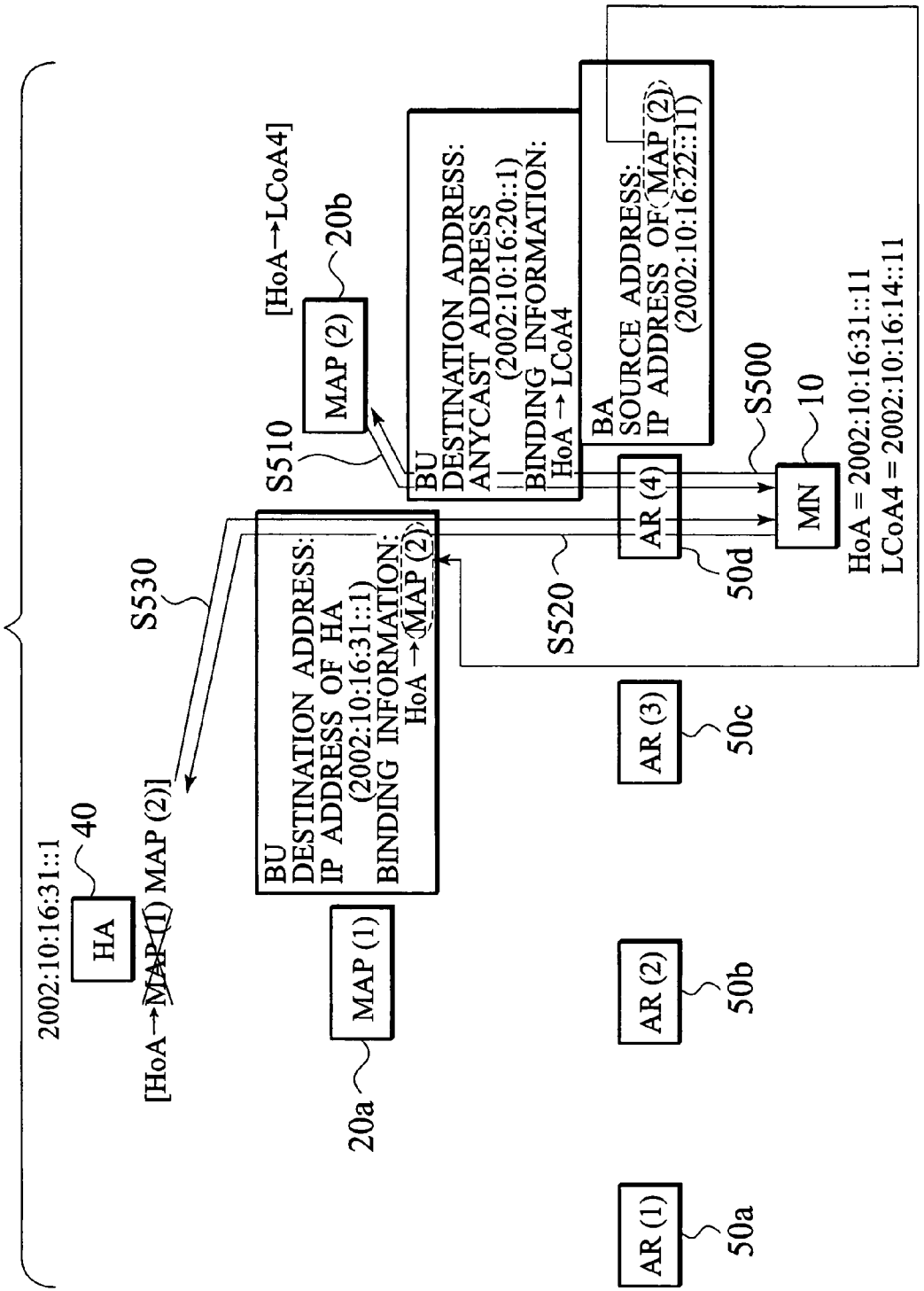
FIG. 23 is a conceptual diagram for explaining a communication method of the Embodiment 2.

FIG. 23 is a conceptual diagram explaining processing of transmitting a BU packet to the MAP (2) 20*b* and the HA 40 for the first time and processing of transmitting the BA packet from the MAP (2) 20*b* and the HA 40 to the MN 10 when the MN 10 is connected to the AR (4) 50*d*.

The mobility management section 13 of the MN 10 generates a BU packet (BU packet containing information which instructs the MAP to execute packet transmission processing based on a correspondence between the HoA and the LCoA 4). This BU packet contains anycast address regarding the plurality of MAPs as destination address. The mobility management section 13 sends the BU packet to the interface 16. The interface 16 sends the BU packet to the AR (4) 50*d*. Then, the BU packet sent from the AR (4) 50*d* is transmitted to the MAP (2) 20*b* which has the shortest distance to the AR (4) 50*d* through one or a plurality of routers based on the anycast address (S500).

The BU packet is sent to the mobility management section 23 of the MAP (2) 20*b*. The mobility management section 23 acquires the HoA contained in the BU packet. The mobility management section 23 determines whether the acquired HoA is contained or not in the binding table. According to the embodiment, since the HoA is not contained in the binding table, the mobility management section 23 executes the following processing.

The mobility management section 23 writes binding information indicating the correspondence between the HoA and the LCoA 4 contained in the received BU packet on the binding table stored in the binding information storage section 24. Subsequently, the mobility management section 23 determines whether a BU packet corresponding to the HoA has been received or not for the fixed period of time.

The mobility management section 23 generates a BA packet which is a response to the BU packet. The BA packet contains an IP address of the MAP (2) 20*b* (source address) as information to specify the MAP. The interface 27 transmits the BA packet to the MN 10 through the AR (4) 50*d* (S510).

The BA packet is sent to the IP control section 12 of the MN 10. The IP control section 12 sends the IP address of the MAP (2) 20*b* to the management section 14. Here, the IP address of the MAP (1) held in the management section 14 is different from that of the MAP (2) sent to the management section 14. Thus, the management section 14 sends information indicating an address change of the MAP to the IP control section 12. Moreover, the management section 14 retains the IP address of the MAP (2) in place of the IP address of the MAP (1) which has been retained.

The IP control section 12 sends a BU packet generation instruction for the HA 40 to the mobility management section 13 based on the information indicating the address change of the MAP. The mobility management section 13 generates a BU packet (BU packet containing information which instructs the HA 40 to execute packet transmission processing based on a correspondence between the HoA and the IP address of the MAP (2)). The BU packet contains the IP address of the HA 40 as a destination address. The mobility management section 13 sends the BU packet to the interface 16. The interface 16 sends the BU packet to the HA 40 (S520).

The BU packet is sent to the mobility management section 43 of the HA 40. The mobility management section 43 determines whether the HoA contained in the BU packet is contained in the biding table. According to the embodiment, since the HoA is contained in the binding table, the following processing is executed. The mobility management section 43 rewrites the information recorded on the binding table as follows. The mobility management section 43 rewrites the binding information indicating the correspondence between the HoA and the IP address of the MAP (1) to be binding information indicating a correspondence between the HoA and the IP address of the MAP (2). Subsequently, the mobility management section 43 determines whether a BU packet corresponding to the HoA has been received or not for the fixed period of time.

Then, the mobility management section 43 generates a BA packet which is a response to the BU packet. The BA packet contains a source address (IP address of the HA 40). The interface 46 transmits the BA packet to the MN 10 through the MAP (2) 20b and the AR (4) 50d (S530).

Figure 24:
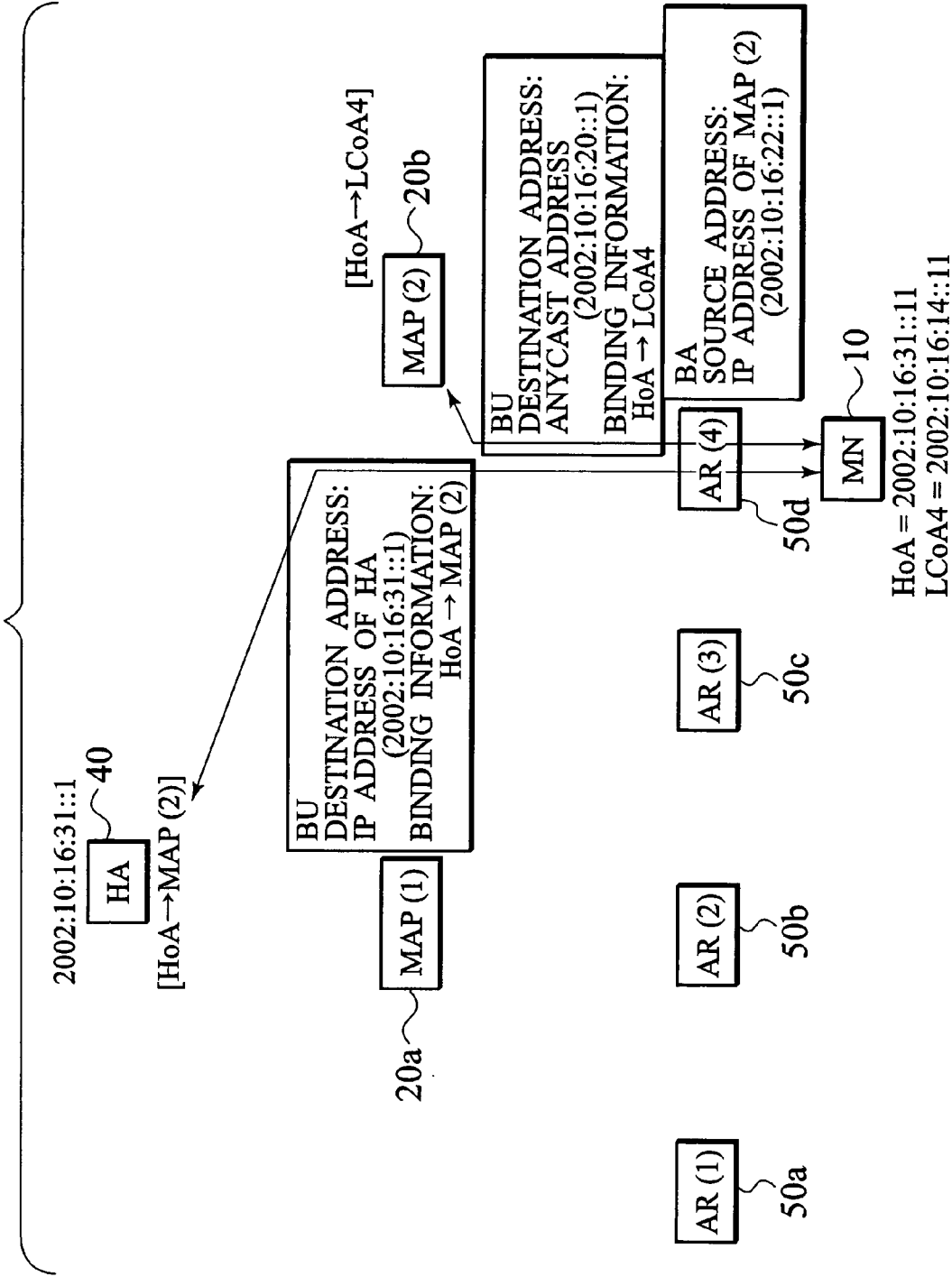
FIG. 24 is a conceptual diagram for explaining a communication method of the Embodiment 2.

FIG. 24 is a conceptual diagram explaining processing of periodically transmitting a BU packet to the MAP (2) and the HA 40 and processing of transmitting a BA packet from the MAP (2) and the HA 40 to the MN 10 when the MN 10 is connected to the AR (4). The transmission processing in this case is equivalent to a case in which the AR (2) is replaced by the AR (4), the LCoA 2 is replaced by the LCoA 4, the IP address of the MAP (1) is replaced by the IP address of the MAP (2), and the MAP (1) is replaced by the MAP (2) in the transmission processing described above with reference to FIG. 19.

According to the embodiment, effects almost similar to those of the Embodiment 1 (excluding the effects regarding the RCoA) are acquired.

MODIFIED EXAMPLE 1

The foregoing Embodiments 1 and 2 may be modified as follows. When the MN 10 is moved to generate new LCoA, the BU packet to which the IP address of the predetermined MAP (e.g., predetermined MAP shown in FIG. 12 or 20) has been added may not be transmitted to the predetermined MAP. Then, if the new LCoA is generated, the BU packet containing the anycast address regarding the plurality of MAPs may be directly transmitted to the predetermined MAP.

MODIFIED EXAMPLE 2

The foregoing Embodiments 1 and 2 may be modified as follows. The MN 10 may transmit the request for information, which specifies the MAP to be used for packet reception separately from the BU packet to the AR.

In this case, the interface 16 of the MN 10 transmits the request for information which specifies the MAP to be used for packet reception and the anycast address which indicates the address regarding the plurality of MAPs to the AR connected to the MN 10. Detailed explanation thereof is as follows.

The mobility management section 13 generates a request for information which specifies MAP to be used for packet reception. For example, the mobility management section 13 acquires anycast address regarding the plurality of MAPs based on binding list information. The mobility management section 13 adds the anycast address to the generated request. The mobility management section 13 sends the request to which the anycast address has been added to the interface 16 through the IP control section 12. The interface 16 transmits the request to which the anycast address has been added to the AR connected to the MN 10.

Then, based on the anycast address added to the request relayed to be transmitted through the AR, one or a plurality of routers transmit the request to the MAP which has the shortest distance to the AR.

The interface 27 of the MAP transmits the information which specifies the MAP to the MN 10 based on the request. Specific processing thereof is as follows. The request is sent to the mobility management section 23. The mobility management section 23 generates response information to the request. This response information contains the information which specifies the MAP.

Hereinafter, description will be made separately between a case in which the IP address of the MAP is contained in the response information and a case in which the RCoA and the IP address of the MAP are contained therein.

(Case in which IP Address of MAP is Contained in Response Information)

For example, the response information contains the IP address of the MAP allocated to its own device. The response information is sent to the interface 27. The interface 27 transmits the response information to the MN 10.

The response information is sent to the management section 14 through the mobility management section 13 of the MN 10. The management section 14 manages the IP address of the MAP contained in the response information as information which specifies MAP currently used for packet reception.

The mobility management section 13 periodically executes the following processing. The mobility management section 13 acquires the LCoA and the IP address of the MAP managed by the management section 14. The mobility management section 13 generates a BU packet (BU packet containing information which instructs execution of packet transmission processing based on a correspondence between the HoA and the LCoA). This BU packet contains the IP address of the MAP as a destination address. The BU packet is sent to the interface 16. The interface 16 transmits the BU packet to the MAP.

(Case in which RCoA And IP Address of MAP are Contained in Response Information)

The mobility management section 23 executes the following processing to generate response information to the request. The mobility management section 23 selects one RCoA from among a plurality of RCoAs stored in the address information storage section 25. The mobility management section 23 contains the acquired RCoA in the response information. In this event, the mobility management section 23 deletes the RCoA from among a plurality of RCoAs stored in the address information storage section 25.

The response information contains the IP address of the MAP as a source address. The response information is sent to the interface 27. The interface 27 transmits the response information to the MN 10.

The response information is sent to the management section 14 through the mobility management section 13 of the MN 10. The management section 14 manages the RCoA and the IP address of the MAP contained in the response information, as information which specifies MAP currently used for packet reception.

The mobility management section 13 periodically executes the following processing. The mobility management section 13 acquires the LCoA, the RCoA and the IP address of the MAP managed by the management section 14. The mobility management section 13 generates a BU packet (BU packet containing information which instructs execution of packet transmission processing based on a correspondence between the RCoA and the LCoA). This BU packet contains the IP address of the MAP as a destination address. The BU packet is sent to the interface 16. The interface 16 transmits the BU packet to the MAP.

MODIFIED EXAMPLE 3

The foregoing Modified Example 2 may be further modified as follows. When the LCoA managed by the management section 14 is changed, the interface 16 of the MN 10 may transmit the request for information which specifies the MAP to be used for packet reception and the anycast address which indicates the address regarding the plurality of MAPs to the AR connected to the MN 10.

For example, in the description of the Modified Example 2, when information indicating a change of the LCoA is received, the mobility management section 13 may generate a request for information which specifies MAP to be used for packet reception. Thereafter, the processing of the Modified Example 2 may be executed.

MODIFIED EXAMPLE 4

The foregoing Modified Examples 2 and 3 may be further modified as follows. When the mobility management section 13 generates response information to the request, the response information may contain information necessary for generating RCoA.

The information which specifies the MAP and is received by the interface 16 of the MN 10 is information necessary for generating a regional care-of address (RCoA) which contains information to specify a network in which the MAP is present. Here, a case of using RCoA as an example of the regional care-of address (RCoA) will be described.

The mobility management section 13 generates RCoA (regional care-of address) based on the information necessary for generating the RCoA. A specific generation process thereof is as follows.

The mobility management section 23 acquires the information necessary for generating the RCoA (e.g., network prefix of the IP address of the MAP). Then, the mobility management section 23 contains the information necessary for generating the RCoA (information which specifies the MAP) in the response information. Subsequently, the response information is transmitted to the MN 10 as in the case of the Modified Example 2.

The response information is sent to the mobility management section 13 of the MN 10. The mobility management section 13 generates RCoA based on the information which is necessary for generating the RCoA and contained in the response information. For example, the mobility management section 13 generates the RCoA based on the network prefix of the IP address of the MAP and the host specification section of the IP address (e.g., HoA) allocated to the MN 10.

Then, the mobility management section 13 sends the generated RCoA and the IP address of the MAP contained in the response information to the management section 14. The management section 14 manages the received RCoA and IP address of the MAP as information which specifies the MAP currently used for packet reception. That is, the management section 14 manages the RCoA (regional care-of address) generated by the mobility management section 13 as information which specifies the MAP currently used for packet reception.

Note that, in the Embodiments 1 and 2, the Modified Example may be applied to cause the MAP to transmit the information necessary for generating the RCoA to the MN 10, and the MN 10 to generate the RCoA based on the information necessary for generating the RCoA. In this case, however, after the generation of the RCoA, the MN 10 must transmit the BU packet to the MAP again.

According to the Modified Example, the information necessary for generating the RCoA is transmitted to the MN 10. Then, the MN 10 can generate the RCoA based on the information necessary for generating the RCoA. Thus, the Modified Example enables the MN 10 to quickly generate the RCoA.

MODIFIED EXAMPLE 5

The foregoing Modified Examples 1 to 4 may be further modified as follows.

The interface 16 may execute the following processing when received information which specifies MAP (hereinafter first MAP) is different from information which specifies MAP (hereinafter second MAP) managed by the management section 14. That is, the interface 16 transmits a BU packet containing information which instructs execution of packet transmission processing based on LCoA (on-link care of address) corresponding to the MN 10 to the first MAP. Moreover, the interface 16 transmits a BU packet containing information which instructs execution of packet transmission processing based on the information to specify the first MAP to the HA 40.

(Case in which Information to Specify MAP is IP Address of MAP)

When the received address of the first MAP is different from that of the second MAP currently managed by the management section 14, the interface 16 transmits to HA 40 a BU packet containing information which instructs execution of packet transmission processing based on the address of the first MAP. A specific process thereof is as follows.

The response information (containing the IP address of the first MAP) transmitted from the interface 27 of the MAP (first MAP) is sent to the mobility management section 13 of the MN 10. The mobility management section 13 sends the IP address of the first MAP to the management section 14. When the IP address of the first MAP is different from the address of the second MAP currently managed by the management section 14, the management section 14 sends information indicating a change of the IP address of the MAP to the mobility management section 13. The mobility management section 13 acquires the LCoA managed by the management section 14 and the IP address of the first MAP. The mobility management section 13 generates a BU packet (BU packet containing information which instructs execution of packet transmission processing based on the correspondence between the HOA and the LCoA). This BU packet contains the IP address of the first MAP as a destination address. The BU packet is sent to the interface 16. The interface 16 transmits the BU packet to the first MAP.

For example, the mobility management section 13 of the MN 10 acquires the IP address of the HA 40 based on the binding list information. The mobility management section 13 generates a BU packet (BU packet containing information which instructs packet transmission processing based on the correspondence between the HoA and the IP address of the first MAP). This BU packet contains the IP address of the HA 40 as a destination address. The BU packet is sent to the interface 16. The interface 16 transmits the BU packet to the HA 40.

(Case in which Information to Specify MAP is IP Address of MAP and RCoA)

The interface 16 executes the following processing when received first RCoA (RCoA containing the network prefix of the IP address of the first MAP) is different from second RCoA (RCoA containing the network prefix of the IP address of the second MAP) managed by the management section 14. That is, the interface 16 transmits first instruction information (BU packet) which instructs execution of packet transmission processing based on a correspondence between the first RCoA and the LCoA (on-link care of address) managed by the management section 14 to the MAP which has transmitted the first RCoA. Then, the interface 16 transmits to the HA 40 second instruction information (BU packet) which instructs execution of packet transmission processing based on the first RCoA. Detailed description thereof is as follows.

The response information (containing the IP address of the first MAP and the RCoA 1 (first RCoA)) transmitted from the interface 27 of the MAP (first MAP) is sent to the mobility management section 13 of the MN 10. The mobility management section 13 sends the IP address of the first MAP and the RCoA 1 to the management section 14. Then, when the RCoA 1 is different from RCoA 2 (second RCoA) currently managed by the management section 14 (in this case, the IP address of the first MAP is different from that of the second MAP), the management section 14 sends information indicating a change of the IP address of the MAP to the mobility management section 13. The mobility management section 13 acquires the LCoA, the RCoA 1 and the IP address of the first MAP managed by the management section 14.

The mobility management section 13 generates a BU packet (BU packet containing information (first instruction information) which instructs execution of packet transmission processing based on the correspondence between the RCoA 1 and the LCoA). This BU packet contains the IP address of the first MAP as a destination address. The BU packet is sent to the interface 16. The interface 16 transmits the BU packet to the first MAP.

The mobility management section 13, for example, acquires the IP address of the HA 40 based on the binding list information. The mobility management section 13 generates a BU packet (BU packet containing information (second instruction information) which instructs packet transmission processing based on the correspondence between the HoA and the RCoA 1). This BU packet contains the IP address of the HA 40 as a destination address. The BU packet is sent to the interface 16. The interface 16 transmits the BU packet to the HA 40.

Note that, the transmission processing of the BU packet to the HA 40 may be executed after the BA packet is transmitted from the first MAP to the MN 10. Moreover, the transmission processing of the BU packet to the HA 40 may be executed in parallel with the processing of the MN 10 to transmit the BU packet to the first MAP.

According to the Modified Example, even if the MAP which has the shortest distance to the AR connected to the MN 10 is changed, the interface 16 of the MN 10 can transmit the BU packet to the MAP which currently has the shortest distance to the AR connected to the MN 10. Moreover, the interface 16 of the MN 10 can transmit the BU packet to the HA 40. Thus, the MN 10 can always receive the packet addressed thereto from the CN 30 through the MAP which has the shortest distance to the AR connected to the MN 10.

MODIFIED EXAMPLE 6

Furthermore, the MN 10 may periodically transmit the request for information which specifies the MAP to be used for packet reception to the AR. For example, the MAP which has the shortest distance from the AR may be changed due to a change of a communication condition (e.g., congested condition of the communication device or congested condition of the communication line). Furthermore, predetermined MAP may be unusable due to failures, accidents or the like.

According to the Modified Example, a distance (e.g., hop count) from each router to the device which holds the anycast address is given to the router. This distance is set, for example, by taking a change of the communication condition, a failure of the device or the like into consideration.

In addition, one or a plurality of routers may transmit the request to the MAP of the plurality of MAPs which has the shortest distance to the AR based on the anycast address (anycast address regarding the plurality of MAPs) added to the request relayed to be transmitted through the ARs.

Various modifications will become possible for those skilled in the art after receiving the teachings of the present disclosure without departing from the scope thereof.

What is claimed is:

1. A communication system including a plurality of transfer devices for transferring packets to a current location of a mobile terminal, a plurality of access router devices arranged in a network to be able to connect to the mobile terminal, a plurality of routers connecting the plurality of access router devices and each of the plurality of transfer devices, and the mobile terminal connected to a first of the plurality of access router devices to receive the packets from one of the plurality of a transfer devices through the first access router device, the system comprising:

a first transmitter provided at the mobile terminal configured to transmit instruction information, which instructs one of the plurality of transfer devices to transfer the packets to the mobile terminal, to an anycast address assigned in common with the plurality of transfer devices;

a second transmitter provided at the first access router device configured to receive the instruction information and to relay the instruction information to a router included in the plurality of routers and connected to the first access router device;

a third transmitter provided at the plurality of routers or the first access router device configured to transmit the instruction information to a nearest transfer device which has a shortest distance from the first access router device on the network among the plurality of transfer devices to which the anycast address is assigned; and a fourth transmitter provided at the nearest transfer device configured to receive the instruction information and to transmit specification information, which specifies the nearest transfer device, to the mobile terminal, wherein when the mobile terminal executes a handoff from the first access router to a second access router, and an on-link care of address used by the mobile terminal is changed from a first on-link care of address to a second on-link care of address based on the handoff, the mobile terminal performs unicast transmission to transmit instruction information that includes the second on-link care of address to be used by the mobile terminal after the handoff to the nearest transfer device having a shortest distance from the first access router to which the mobile terminal was connected prior to the handoff.

2. The communication system according to claim 1, wherein each of the plurality of transfer devices transmits packets, transmitted from a communication opponent device and addressed to the mobile terminal, to the first access router device based on the first on-link care of address which indicates a location of the current location of the mobile terminal, the first transmitter transmits the instruction information, which instructs one of the plurality of transfer devices to transfer the packets to the mobile terminal based on the first on-link care of address of the mobile terminal, the fourth transmitter further configured to transfer the packets based on the first on-link care of address of the mobile terminal in accordance with the instruction information, and the mobile terminal includes an acquisition unit configured to acquire the specification information transmitted from the third transmitter.

3. A mobile terminal used in a communication system which includes a plurality of transfer devices for transferring packets to a current location of the mobile terminal, a plurality of access router devices arranged in a network to connect to the mobile terminal, a plurality of routers connecting the plurality of access router devices and each of the plurality of transfer devices, and the mobile terminal connected to a first of the plurality of access router devices to receive the packets from one of the plurality of a transfer devices through the first access router device, the mobile terminal comprising:

a first transmitter configured to transmit first instruction information, which instructs one of the plurality of transfer devices to transfer the packets to the mobile terminal, to an anycast address assigned in common with the plurality of transfer devices; and a receiver configured to receive specification information specifying a nearest transfer device, which has a shortest distance from the first access router device on the network among the plurality of transfer devices, when the first instruction information is transmitted to the nearest transfer device based on the anycast address, wherein when the mobile terminal executes a handoff from the first access router to a second access router, and an on-link care of address used by the mobile terminal is changed from a first on-link care of address to a second on-link care of address based on the handoff, the mobile terminal performs unicast transmission to transmit instruction information that includes the second on-link care of address to be used by the mobile terminal after the handoff to the nearest transfer device having a shortest distance from the first access router to which the mobile terminal was connected prior to the handoff.

4. The mobile terminal according to claim 3, further comprising:

a first manager configured to manage the first on-link care of address which indicates a current location of the mobile terminal, wherein, the first transmitter transmits the first instruction information when the first on-link care of address managed by the first manager is changed.

5. The mobile terminal according to claim 3, further comprising:

a second manager configured to manage information which specifies a transfer device currently used for packet reception, and a second transmitter configured to transmit a second instruction information to the transfer device specified by the specification information and to transmit third instruction information to a home agent device, when the specification information is different from the information managed by the second manager, wherein the second instruction information instructs the transfer device specified by the specification information to transfer the packets to the mobile terminal based on the first on-link care of address which indicates a location of the current location of the mobile terminal, and the third instruction information instructs the home agent to transfer the packets to the mobile terminal based on the specification information.

6. The mobile terminal according to claim 5, wherein the specification information received by the receiver is necessary for generating a regional care-of address which contains information specifying a network in which the transfer device having the shortest distance from the first access router device is present, a generator is disposed and configured to generate the regional care-of address based on the specification information, and the second manager manages the regional care-of address generated by the generator as information which specifies the transfer device currently used for packet reception.

7. The mobile terminal according to claim 5, wherein the specification information received by the receiver is a regional care-of address which contains information specifying a network in which the transfer device having the shortest distance from the first access router device is present, and the second manager manages the regional care-of address received by the receiver as information which specifies the transfer device currently used for packet reception.

8. The mobile terminal according to claim 7, wherein the second transmitter transmits the second instruction information to the transfer device specified by the specification information and transmits the third instruction information to the home agent device, when the regional care-of address received by the receiver is different from the regional care-of address managed by the second manager, and the second instruction information instructs the transfer device specified by the specification information to transfer the packets to the mobile terminal based on a correspondence between the regional care-of address received by the receiver and the first on-link care of addresses, and the third instructs the home agent to transfer the packets to the mobile terminal based on the first regional care-of address received by the receiver.

9. The mobile terminal according to claim 3, further comprising:

a first acquisition unit configured to acquire the specification information specifying the transfer device which has the shortest distance from the first access router device received by the receiver as information which specifies a transfer device used for packet reception, wherein the first transmitter transmits the first instruction information, which instructs one of the plurality of transfer devices to transfer the packets to the mobile terminal based on the first on-link care of address which indicates a location of the current location of the mobile terminal.

10. The mobile terminal according to claim 9, further comprising:
   a first manager configured to manage the first on-link care of address of the mobile terminal;
   a second manager configured to manage information which specifies the transfer device currently used for packet reception; and
   a third transmitter configured to transmit a fourth instruction information to the transfer device currently used for packet reception, when the first on-link care of address managed by the first manager is changed to the second on-link care of address,
   wherein the fourth instruction information instructs the transfer device currently used for packet reception to transfer device currently used for packet reception to transfer the packets to the mobile terminal based on the second on-link care of address, and
   after the execution of the transmission processing of the fourth instruction information by the third transmitter, the first transmitter transmits the first instruction information at each time interval shorter than the fixed period of time.

11. The mobile terminal according to claim 3, further comprising:
   a second acquisition unit configured to acquire information which specifies a transfer device used for packet reception,
   wherein the first transmitter transmits the first instruction information, which instructs one of the plurality of transfer devices to transfer the packets to the mobile terminal based on a correspondence between the first on-link care of address, which indicates a location of the current location of the mobile terminal, and a predetermined regional care-of address,
   the specification information received by the receiver is a regional care-of address which contains information specifying a network in which the transfer device having the shortest distance from the first access router device is present, and
   the second acquisition unit acquires the regional care-of address of the transfer device having the shortest distance from the first access router device as the information which specifies the transfer device used for packet reception, in a case where the predetermined regional care-of address contains no information specifying the network in which the transfer device having the shortest distance from the first access router device is present.

12. The mobile terminal according to claim 11, further comprising:
   a fourth transmitter configured to transmit fifth instruction information to a home agent device,
   wherein the fifth instruction information instructs the home agent to transfer the packets to the mobile terminal based on the regional care-of address of the transfer device having the shortest distance from the first access router device.

13. The mobile terminal according to claim 3, further comprising:
   a third manager configured to manage an address of a transfer device currently used for packet reception, and
   a fifth transmitter configured to transmit a sixth instruction to a home agent device,
   wherein the specification information received by the receiver is an address allocated to the transfer device having the shortest distance from the first access router device,
   the sixth instruction information instructs the home agent to transfer the packets to the mobile terminal based on the address allocated to the transfer device having the shortest distance from the first access router device, and
   the fifth transmitter transmits the sixth instruction information, when the address allocated to the transfer device having the shortest distance from the first access router device is different from the address managed by the third manager.

\* \* \* \* \*